(12) United States Patent
Yoshinaga

(10) Patent No.: US 9,221,606 B2
(45) Date of Patent: Dec. 29, 2015

(54) GOODS TRANSPORT FACILITY

(75) Inventor: Kazuharu Yoshinaga, Shiga (JP)

(73) Assignee: DAIFUKU CO., LTD, Osaka (JP)

( * ) Notice: Subject to any disclaimer, the term of this patent is extended or adjusted under 35 U.S.C. 154(b) by 16 days.

(21) Appl. No.: 13/811,458

(22) PCT Filed: May 24, 2011

(86) PCT No.: PCT/JP2011/061872
§ 371 (c)(1),
(2), (4) Date: Apr. 8, 2013

(87) PCT Pub. No.: WO2012/011317
PCT Pub. Date: Jan. 26, 2012

(65) Prior Publication Data
US 2013/0270063 A1    Oct. 17, 2013

(30) Foreign Application Priority Data

Jul. 23, 2010  (JP) .................................. 2010-166304

(51) Int. Cl.
*B65G 1/04* (2006.01)
*A62C 37/36* (2006.01)
*A62C 3/00* (2006.01)

(52) U.S. Cl.
CPC .............. *B65G 1/0421* (2013.01); *A62C 3/002* (2013.01); *A62C 37/36* (2013.01); *B65G 2207/22* (2013.01)

(58) Field of Classification Search
CPC ....... B65G 1/0421; A62C 3/002; A62C 37/36
See application file for complete search history.

(56) References Cited

U.S. PATENT DOCUMENTS

| | | | | |
|---|---|---|---|---|
| 3,602,313 | A | * | 8/1971 | Achs ...................... A62C 3/002 169/16 |
| 4,178,994 | A | * | 12/1979 | Ito .......................... A62C 3/002 169/16 |
| 7,561,254 | B2 | * | 7/2009 | Koide .................. B65G 1/0421 356/28 |

(Continued)

FOREIGN PATENT DOCUMENTS

| | | |
|---|---|---|
| CN | 1927673 | 3/2007 |
| CN | 101125603 | 2/2008 |

(Continued)

OTHER PUBLICATIONS

International Search Report for PCT/JP2011/061872, English translation attached to original, Both completed by the Japanese Patent Office on Sep. 6, 2011, All together 6 Pages.

*Primary Examiner* — Gene Crawford
*Assistant Examiner* — Thomas Randazzo
(74) *Attorney, Agent, or Firm* — Brooks Kushman P.C.

(57) ABSTRACT

A goods transport facility provided with a detected body installed on the ground side for providing stop control. A detected-body detector on a mobile assembly detects the presence of the detected body. The goods transport facility is switchable between a first and a second control status so that when a fire detector means detects that no goods are on fire, the first control status is maintained. Once the fire detector detects a fire, the status is switched to the second control status. In the first control status, a mobile assembly control provides travel control using an optical distance-measuring sensor to control the actuation of the mobile assembly. In the second control status, the actuation of the mobile assembly travels until detected by the detected-body detector for a goods storage section to which goods are to be transferred, and brought into alignment with the target travel position.

14 Claims, 20 Drawing Sheets

(56) References Cited

U.S. PATENT DOCUMENTS

| | | | | |
|---|---|---|---|---|
| 7,729,797 B2* | 6/2010 | Akamatsu | ............ | B65G 1/0421 700/214 |
| 7,949,423 B2* | 5/2011 | Tsukamoto | .......... | B65G 1/0421 700/214 |
| 7,953,514 B2* | 5/2011 | Kim | .................... | B65G 1/0421 700/214 |
| 8,807,234 B2* | 8/2014 | Ariizumi | ................ | A62C 3/002 169/11 |
| 2006/0051190 A1* | 3/2006 | Taguchi | ............... | B65G 1/0421 414/279 |

FOREIGN PATENT DOCUMENTS

| | | | | | |
|---|---|---|---|---|---|
| JP | 08324716 | | 12/1996 | | |
| JP | 09-150911 | * | 6/1997 | ............... | B65G 1/04 |
| JP | 09150911 | | 6/1997 | | |
| JP | 2009150911 | * | 6/1997 | ............... | B65G 1/04 |
| JP | 09226909 | | 9/1997 | | |
| JP | 09235004 | | 9/1997 | | |
| JP | 2000351415 | | 12/2000 | | |
| JP | 3123424 | * | 1/2001 | ............. | A62C 37/40 |
| JP | 2009161321 | | 7/2009 | | |

* cited by examiner

GOODS TRANSPORT FACILITY

CROSS-REFERENCE TO RELATED APPLICATION

This application is the U.S. national phase of PCT Appln. No. PCT/JP2011/061872 filed on May 24, 2011, which claims priority to Japanese Patent Application No. 2010-166304 filed on Jul. 23, 2010, the disclosures of which are incorporated in their entirety by reference herein.

TECHNICAL FIELD

The present invention relates to article transporting facilities, comprising: a movable body for conveying articles which can freely travel along a traveling path and can freely transfer articles among a plurality of article holding sections provided along the traveling path; an optical ranging means for detecting a distance between a reference position for travelling and the movable body on the traveling path by projecting a measurement light along the traveling path; a movable body controlling means for i) controlling the travelling operation of the movable body so that the position of the movable body on the travelling path becomes coincident to a target travel position set out to correspond to the article holding section in accordance with a distance measured by the optical ranging means, and for ii) controlling the transfer of articles between the article holding sections while keeping the movable body stopped at the target travel position for the article holding section, in order to transport articles among a plurality of article holding sections; a fire detecting means for detecting fire which occurs in an article held in the article holding sections; a fire extinguishing means for freely spraying a fire extinguishing agent; and a fire extinguishment controlling means for activating the fire extinguishing means when a fire on the articles is detected by the fire detecting means.

BACKGROUND OF THE INVENTION

Japanese Patent No. 3123424 discloses conventional article transporting facilities, which comprise a plurality of article holding sections, i.e. the storages of article storing racks and the loading sections of a conveyer, a stacker crane as a movable body for freely transferring articles among the article holding sections, a fire detecting means for detecting fire which occurs in an article held in the article holding sections, and a fire extinguishing means for freely spraying a fire extinguishing agent.

This patent does not give a detailed explanation of the traveling control of the movable body; however, a movable body for conveying articles, such as a stacker crane, generally uses such a technology in which an optical ranging means is provided to detect a distance between the reference position for travelling and the movable body on the traveling path by projecting a measurement light along the traveling path, making the movable body travel to the target travel position on the traveling path in accordance with the detected distance by the optical ranging means, as mentioned in Japanese Patent Preliminarily Publication No. 2009-161321.

As disclosed in the publication, the optical ranging means normally uses a laser light beam as the measurement light. In this publication, a reference position on the ground side is set in the vicinity of the end portion of the travelling path; a reflection plate is provided at the reference position to reflect the laser light beam from the laser ranging meter, which is provided on the movable body side. A laser light for ranging is projected from the laser ranging meter to the reflection plate and the laser light reflected back by the reflection plate is received by the laser ranging meter to detect the distance between the meter and the reflection plate.

TASK TO BE SOLVED BY THE INVENTION

In conventional article transporting facilities, when an extinguishing agent is dispersed to an article on fire by the fire extinguishing means for extinguishing the fire, carbon dioxide, for example, is used as the extinguishing agent; the carbon dioxide is prayed out of carbon dioxide gas contains with an ultra low temperature which makes water vapor in the ambient air freeze such that white smoke is generated. Due to the smoke, the measurement light projected from the optical ranging means is interrupted, so that the distance between the reference position for travelling and the movable body cannot be measured. Therefore, it would not be possible for the movable body to travel immediately after the carbon dioxide has been sprayed. Thus, saving articles around the fire, taking out the article that is on fire, or additional extinguishing operations using the movable body could not be carried out at least until the smoke has disappeared, and therefore the movable body cannot be made quickly available to travel after the extinguishing operation. Such problems notably occur when carbon dioxide gas is used as the extinguishing agent, but could happen even if a fine powder extinguishing agent is used.

The present invention has been made taking the above-mentioned situation into consideration, with the purpose to provide article transporting facilities in which the movable body can travel even immediately after the extinguishing agent has been sprayed.

MEANS FOR SOLVING THE TASK

In order to carry out this purpose, the first characterized construction of the article transporting facilities according to the present invention is to provide article transporting facilities, comprising a movable body for conveying articles which can freely travel along a traveling path and can freely transfer articles among a plurality of article holding sections provided along the traveling path; an optical ranging means for detecting a distance between a reference position for travelling and the movable body on the traveling path by projecting a measurement light along the traveling path; a movable body controlling means for controlling the travel of the movable body whereby the position of the movable body becomes a target travel position, which has been set to correspond to an article holding section, on the traveling path in accordance with a distance measured by the optical ranging means and for controlling the transfer of articles between article holding sections whilst keeping the movable body stopped at the target travel position for the article holding section, in order to transport articles among a plurality of article holding sections; a fire detecting means for detecting fire when a fire occurs on the articles held in the article holding sections; a fire extinguishing means for freely spraying a fire extinguishing agent; a fire extinguishing controlling means to activate the fire extinguishing means when a fire in the articles is detected by the fire detecting means:

wherein an object to be detected used for controlling a stop operation being provided at the ground side corresponding to the article holding sections and a detecting apparatus is provided at the movable body side for detecting the presence of the object to be detected by functioning with the object to be detected;

wherein the movable body controlling means can be freely switched between a first control state, under which the travelling of the movable body is controlled by the control of the travelling of the movable body in accordance with the distance measured by the optical ranging means, and a second control state, under which the traveling operation of the movable body is controlled such that the movable body is traveled to the target travel position set to correspond to an article holding section until the detecting apparatus for detecting the object to be detected detects the object to be detected pertaining to the article holding section which holds the article to be transferred; and wherein the first control state is maintained during the time when no fire is detected in articles by the fire detecting means, whilst the first control state is switched to the second control state when a fire is detected in an article by the fire detecting means.

According to the first characterized construction, if there is no fire occurring and thus the fire detecting means does not detect any fire, the movable body controlling means maintains the first control state. Therefore, the movable body controlling means performs the travel control of the movable body such that the position of the movable body on the travelling path is coincident to the target travel position set to correspond to an article holding section, in accordance with the distance detected by the optical ranging means. Thus, under the first control state, it is possible to control the travelling operation of the movable body to make it move to the target travel position, whilst recognizing the current position thereof.

When a fire occurs in an article, the fire detecting means detects it and the fire extinguish controlling means activates the fire extinguishing means. Meanwhile, the operating state of the movable body controlling means switches from the first control state to the second control state when the fire detecting means detects a fire. By this switching, the movable body controlling means controls the movable body to move it until the object to be detected pertains to the target article holding section is detected by the detecting apparatus. Thus the travelling operation of the movable body is controlled so that the position of the movable body is coincident to the target travel position, which is set to correspond to the article holding section. That is to say, under the second control state, the movable body can be traveled to the target travel position without using the distance detecting by the optical ranging means. Therefore, even if the measurement light of the optical ranging means is interrupted, the movable body can travel to the target travel position.

Consequently, in the time immediately following the operating of the fir extinguishing means by the fire extinguishing controlling means when a fire in an article is detected by the fire detecting means, even if the measurement light from the optical ranging means is interrupted by the fire extinguishing agent sprayed by the fire extinguishing means, it is possible to for example carry out the sheltering operation of the articles around the fire, the taking-out operation of the fired/firing articles, or a further fire extinguishing operation, by using the movable body. In this manner, according to the first characterized construction, article transporting facilities can be achieved, by which the movable body can be traveled even immediately after the extinguishing agent has been sprayed.

The second characterized construction of the article transporting facilities according to the present invention is: at least one of the plurality of article holding sections is constituted as an article on fired article extinguishing section that is provided with fired article extinguishing means; the object to be detected is provided solely with respect to the fired article extinguishing section; the fire detecting means is constituted to detect the occurrence of fire under a condition of identifying the fired article holding section where the fired article is held; the travelling speed of the movable body under the second control condition is set to be slower than the travelling speed of the movable body under the first control condition; the movable body controlling means is constructed such that when an occurrence of fire is detected by the fire detecting means under the first control condition the travelling control before fire extinguishing for travelling the movable body to the fired article holding section is executed while maintaining the first control condition, once the travelling control before fire extinguishing has been completed the first control condition is switched to the second control condition, and under the second control condition an article on fire transferring control for controlling the travelling and transferring operation of the movable body to convey the fired article from the fired article holding section to the fired article extinguishing section is performed; and when the traveling control before fire extinguishing has been completed the fire extinguish controlling means operates the fire extinguishing means to perform the fire extinguishing.

It is a requirement that a fire be completely extinguished by conveying the fired article held in the fired article holding section to the fired article extinguishing section having a fire extinguishing means, which is provided as an article holding section.

Thus, according to the second characterized construction, the fired article transfer control is conducted by the movable body controlling means to transfer the fired article from the fired article holding section to the fired article extinguishing section. In order to commence the fired article transfer control at the earliest possible stage, the movable body controlling means performs the travelling control before fire extinguishment which makes the movable body move to the fired article holding section while maintaining the first control state. That is to say, the travelling speed of the movable body under the first control state is set to be faster than that under the second control state, and therefore the movable body can be moved to the fired article holding section at high speed by making the movable body travel to the fired article holding section whilst the first control state is being maintained. In addition, since the fire extinguish controlling means performs the fire extinguishing control so as to operate the fire extinguish means upon completion of the travelling control before fire extinguishment, the fire extinguishing means will not operate until the travelling control before fire extinguishment has been so completed. Therefore, during the period when the travelling control before fire extinguishment is being performed, the measurement light projected by the optical ranging means will not be interrupted by smoke even if the first control state is being maintained, thus ensuring that the movable body can be traveled without fail.

In this manner, the fired article can be taken out from the fired article holding section at the earliest stage possible since the fired article conveying control can be commenced at the earliest possible stage. Thereby the spread of fire to the surrounding area can be prevented. Also, fired articles can be completely extinguished without fail since they are conveyed to the fired article extinguishing section by the fired article conveying control, thus ensuring that problems such a fire spreading at the destination do not occur.

In summary, according to the second characteristic construction of the present invention, the travel of the moving body is quickly and assuredly controlled by the travelling control before fire extinguishment, thereby enabling commencement of the fired article conveying control at the earliest possible time so that fire in the article is prevented from spreading to the surround of the fired article holding section, and the fired article is extinguished at the places it has been delivered to so that the fire can be prevented from spreading at this place, thus ensuring that the facilities are properly protected from the fire.

The third characterized control of the article transporting facilities according to the present invention is that: the movable body controlling means is constructed such that when an occurrence of fire is detected by the fire detecting means during the period when the movable body controlling means is performing the travelling control or the transferring control so as to convey the articles between the article holding sections under the first control state, the traveling control before fire extinguishing is performed after the transfer of the article has been interrupted or completed to render the movable body in a condition in which it holds no article.

According to the third characterized construction, when the travel control before fire extinguishment is being performed, it is possible that the movable body is in condition in which it is not holding any articles. Thus, it is possible to ensure that the fired article is held on the movable body with certainty by transferring it from the fired article holding section to the movable body after it has been moved to the fired article holding section by the travel control before fire extinguishing. In this way, inconvenient situations can be avoided such as the movable body moving to a fired article holding section with an article already being held thereon, such that the movable body cannot be made to hold the fired article and fired article transferring control cannot be performed.

The fourth characterized construction of the article transporting facilities according to the present invention is that: the fire extinguishing means is provided on the movable body and is constructed to be capable of freely spraying an extinguishing agent against the fired articles held in the fired article holding section and against the fired article held on the movable body; the fire extinguishing controlling means is constituted such that once the travel control before fire extinguishing has been completed a primary fire extinguishing control for controlling the operation of the fire extinguishing means to spray the fire extinguishing agent against the fired articles held in the fired article holding section is performed for a first predetermined period of time, and once the transfer of the fired article from the fired article holding section to the movable body has been completed by executing the fired article transferring control a secondary fire extinguishing control for controlling the operation of the fire extinguishing means to spray the fire extinguishing agent against the fired articles held on the movable body is performed for a second predetermined period of time; and when the primary fire extinguishing control by the fire extinguishing controlling means has been completed, the movable body controlling means initiates the performing of the fired article conveying control.

According to the fourth characterized construction of the present invention, the fire extinguishing means is provided on the movable body and thus it is not necessary to provide a fire extinguishing means on each article holding section, so that the cost for establishing the facilities can be kept low. Further, by the fire extinguishing controlling means executing the primary fire extinguishing control, the commencement of the fired article conveying control comes after the fired article held in the fired article holding section has been primary extinguished by the fire extinguishing means provided on the movable body. Therefore, during the period when the fired article conveying control is being conducted, the operation to transfer the fired article from the fired article holding section to the movable body can be conducted in a comparatively safe manner. In addition, after the transfer of the fired article to the movable body has been completed, the fire extinguishing controlling means performs the secondary fire extinguishing control, by which a fire extinguishing agent is sprayed over the fired article being held on the movable body, and thus the second fire extinguishing control is performed following to the primary fire extinguishing control, which ensures a sufficient extinguishing action is performed against the fired article. Since the fired article conveying control has been commenced when the primary fire extinguishing control is completed, the fired article conveying control can be conducted in parallel with the secondary fire extinguishing control. This means the fired article can be transferred to the fired article extinguishing section at the earliest possible time, while effecting a sufficient extinguishing action against the fired article.

The fifth characterized construction of the article transporting facilities according to the present invention is that: an article storing rack having a plurality of article storage sections arranged vertically and horizontally in an extensive manner, article loading portions being provided at the lateral side and in the width direction of the article storing racks, and the stacker crane as the movable body, which freely travels along a travelling path provided at the front surface side of the article storing rack and freely transfers articles between the article storage sections and the article loading portions functioning as the article holding sections are provided; at least one of the article loading portions is provided on an article on fire article extinguishment section;

the stacker crane comprises a carriage being able to freely travel along the travelling path, an lift being freely liftable up and down along a lifting path provided along a mast stood from the carriage, a transferring apparatus being freely liftable up and down integrally with the lift and having an article mount body for mounting and supporting articles, which is arranged to be movable back and forth between a retired position back from the travelling path side and a protruded position protruding to the article storing rack side; an optical ranging means used for the lifting operation for detecting a distance between a reference position and the lift on the lifting path by projecting a measurement light along the mast; an object to be detected used for the lifting operation for controlling the stopping of the lifting operation which is provided on the mast in correspondence to the height of the lift at the timing when transferring an article to the fired article extinguishing section; and a detecting means for detecting the presence of the object to be detected used for the lifting operation by functioning to detect the object to be detected;

the movable body controlling means is constituted such that:

under the first control condition, when transferring articles from the article holding section to the stacker crane, the travelling operation of the carriage is controlled so as to position the carriage at a target travelling position corresponding to the article holding section, and the lifting operation of the lift is controlled so that the position of the lift is lifted to a target lifting position for scooping an article corresponding to the article holding section, and a scooping operation as the article transferring control is performed such that the article transferring apparatus is protruded so that the article mount body is positioned at a protruded position under the article to be transferred, whilst the carriage is kept stopped at the target travelling position corresponding to the article holding section; after which the lift is lifted up so that the distance detected by the optical ranging means changes by a predetermined amount, after which the transferring apparatus is retired back to position the article mount body at the position to perform the scooping operation; and under the first control condition, when an article is transferred from the stacker crane to the article holding section, the travelling control operates so that the carriage is positioned at a target travelling position corresponding to the article holding section and the lift is lifted up/down so as to come to the target position for unloading, in accordance with the distance detected by the optical ranging means; the transferring control is performed such that the transferring apparatus is protruded so as to position the article mount body at a protruded position above the article holding section whilst the carriage is kept stopped at the target position for travelling corresponding to the article holding section, after which the lift is lifted down so that the distance detected by the optical ranging means changes by a predetermined amount, after which the transferring apparatus is retired back so as to position the article mount body at the retired back position to perform the scooping operation; and under the first control condition, when an occurrence of fire is detected by the fire detecting means, the travel control before fire extinguishing is performed to move the stacker crane to a target travelling position set to be correspond to the article storing section, functioning as the fired article holding section, and then the lifting control before fire extinguishing is performed so that the position of the lift comes to the target lifted position for the scooping operation, corresponding to the article storing position, in accordance with the distance detected by the optical ranging means; and once the traveling control before fire extinguishing and the lifting control before fire extinguishing have been completed, the first control condition is switched to the second control condition; and in cases when the fired article transferring control is performed under the second control condition, when the fired article is transferred from the article storing section to the stacker crane, the moving body controlling means performs a scooping control for transferring the article on fire as the transfer control such that the transferring apparatus is protruded so as to position the article mount body at the protruded position under the article in fire, after which the lift is lifted up at a predetermined lifting speed for a predetermined period of time, after which the transferring apparatus is retired back so as to position the article mount body to the retired position; and in cases when the fired article transferring control is performed under the second control condition, when the fired article is transferred from the stacker crane to the fired article extinguishing section, a scooping control for transferring the article in fire as the transferring control is performed such that the transfer apparatus is protruded so as to render the article mount at the protruded position above the fired article extinguishing section, after which the lift is lifted down at a predetermined lifting speed for a predetermined period of time, after which the transferring apparatus is retired back to put the article mount body to the retired position.

According to this characterized construction, the article storing section having a plurality of storages expanding out in a vertical and horizontal manner is provided so that articles can be effectively so stored; however, once a fire occurs in an article stored, any fire spreading to the adjacent storages would be particularly problematic. Concerning this point, according to the characterized construction of the present invention, once an occurrence of fire has been detected, the movable body controlling means performs both the travel control before fire extinguishing and the lifting control before fire extinguishing, and after completing both controls the fire extinguishing controlling means works to operate the fire extinguishing means, while maintaining the first control condition. Therefore, the transfer apparatus of the stacker crane is speedily positioned to the relevant fired article storage in order to commence the performing of the fired article transferring control as soon as possible. It is possible to take off the fired article from the article storing rack at the highest risk of spreading the fire at an earliest possible stage and to transfer the fired article to the fired article extinguishing section.

Further, when the transferring apparatus having a freely protruded and retiring article mount body loads/unloads the article to/from an article storage or the article loading portion, it is necessary to perform the protruding operation of the transferring apparatus, the lifting up/down operation of the lift, and the retiring back operation of the transferring apparatus in a successive order. In case when no fire is occurring, the movable body controlling means can transfer the article between the article storage and the article loading section by performing a scooping control/unloading control as the article transfer control, which is performed in a manner such that when an article is being when from the article holding section to the stacker crane or when an article is being transferred from the stacker crane to the article holding section under the first control condition, the lift is lifted up (scooping) or down (unloading) so as to change the distance detected by the optical ranging means by a predetermined amount after the transferring apparatus is protruded, and then the apparatus is retired back.

However, the fired article transferring control is conducted after a fire extinguishing agent has been sprayed by the fire extinguishing means, as is the case for the traveling or lifting control the optical ranging means cannot be used for the scooping or unloading control, due to the affect of the fire extinguishing agent. Thus, in cases when a fired article is transferred from the article storage to the stacker crane when the fired article transferring control is conducted under the second control condition, or in cases when an article on fire is transferred from the stacker crane to the fired article extinguishing section when the fired article transferring control is conducted under the second control state, the lift is lifted up or down at a predetermined lifting speed for a predetermined period of time after the transferring apparatus has been protruded by the performing of the scooping control for the transferring a fired article or the unloading control for the transferring of fired article, after which the transferring apparatus is retired back. Thereby, even if the fired article transferring operation is conducted after fire extinguishing agent has been sprayed, the article can be properly transferred to the storage or the fired article extinguishing section.

The sixth characterized construction of the present invention is that: the movable body controlling means comprises a ground side controlling apparatus being provided at the end portion of the travelling path at the ground side and a movable body side controlling apparatus being provided at the movable body side that is capable of freely communicating wirelessly with the ground side controlling apparatus with the aid of an optical communication device for transmitting and receiving a communicating light along the travelling path; in which an emergency stop means is provided, by which the travelling of the movable body is made to stop in case the communicating light is blocked when the movable body controlling means is in the first control state; and the emergency stop means is constructed such that when the movable body controlling means is in the second control state, it does not make the movable body stop even if the communicating light is blocked.

According to the sixth characterized feature, when the communicating light is lost under the first control state, the emergency stop means forces the travelling of the movable body to a stop, determining that something is wrong in the optical communication device. In this way, an occurrence of unexpected situations such as the overrunning of the movable body can be prevented. After a fire has occurred and an extinguishing agent has been sprayed, the communicating light transmitted/received by the optical communication device can be interrupted. If the travelling of the movable body is forced to stop by the emergency stop means in such a case, the travel of the movable body for instance is stopped in mid-operation of the movable body controlling means conducting the fired article transferring control for making the movable body travel, even though the optical communication with the ground side control apparatus is not performed. According to the sixth characterized construction, during the time when the movable body controlling means is under the second control condition, the emergency stop means does not force the movable body to stop even if the communicating light is lost. Therefore, even after a fire occurs and an extinguishing agent is sprayed, the travelling operation of the movable body in the second control condition can be continuously controlled.

EMBODIMENT FOR CARRYING OUT THE INVENTION

Figure 1:
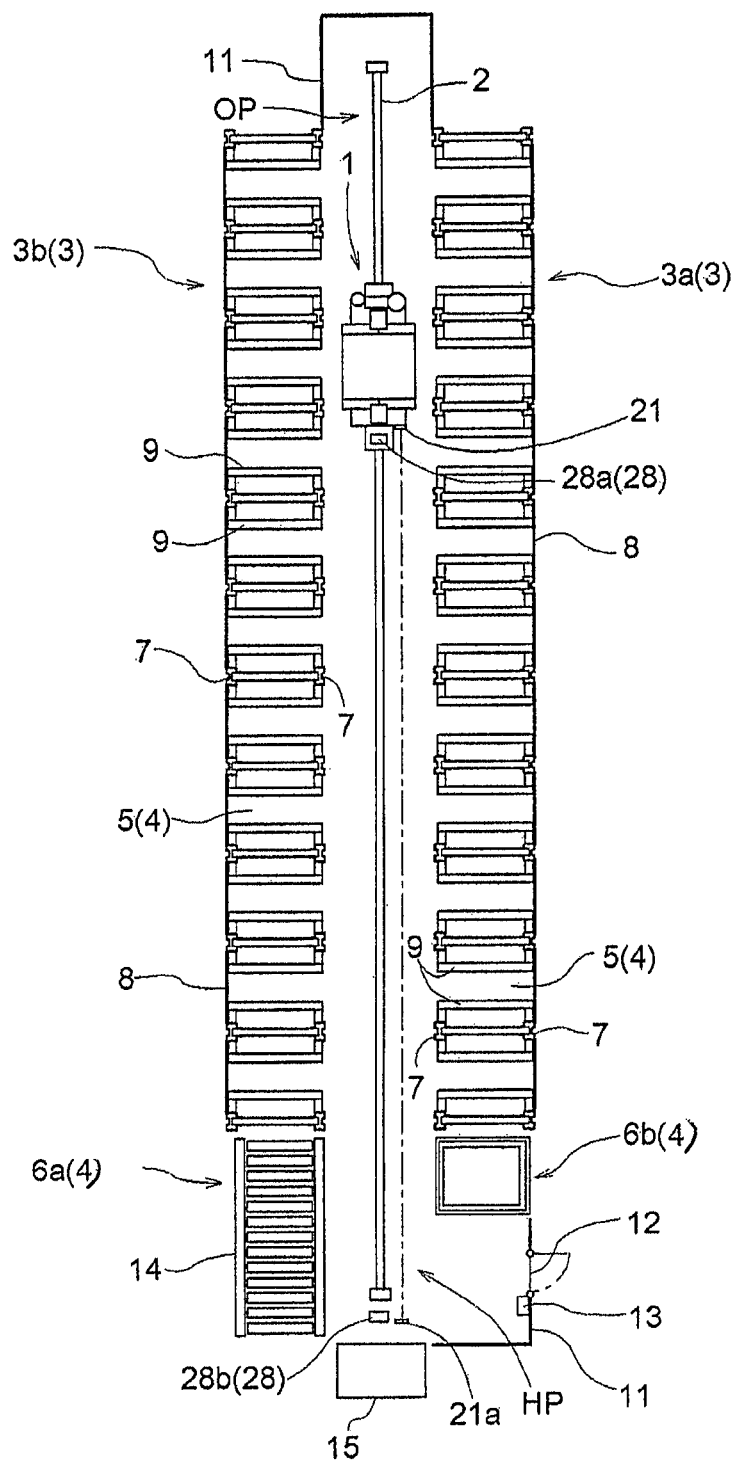
FIG. 1 is a whole plan view of the article transferring facilities of the present invention.

Embodiments of the article transporting facilities according to the present invention will be explained, referring to the drawings. The article transporting facilities of the present embodiment comprises a stacker crane 1 as a movable body, as shown in FIG. 1. The stacker crane 1 is guided by a linear ended travelling rail 2 laid on the floor so as to be freely able to travel along a linear travelling path. On both sides of the travelling path of the stacker crane, a pair of article storing racks 3 (the first storing rack 3a at the right side and the second storing rack 3b at the left side, respectively, on FIG. 1) is provided at certain intervals in such a manner that the directions for the loading/unloading of an article on the racks 3a or 3b are opposite to each other.

The articles to be operated in the present embodiment are charged secondary batteries, which are stored in the article storing racks 3 for the purpose of aging; they are unloaded from the racks after being stored for a certain time period. In preparation for cases when the articles stored therein are heated and then set on fire, a fire detecting means 10 or a fire extinguishing means E are provided in these article transporting facilities. Thus, the facilities have a fire control system, by which appropriate operations for the extinguishing of fire and prevention of the spread of fire are automatically conducted. The construction of the article transporting facilities and the operation of the fire control system in case of the occurrence of fire will be explained below.

[Article Storing Rack]

Figure 2:
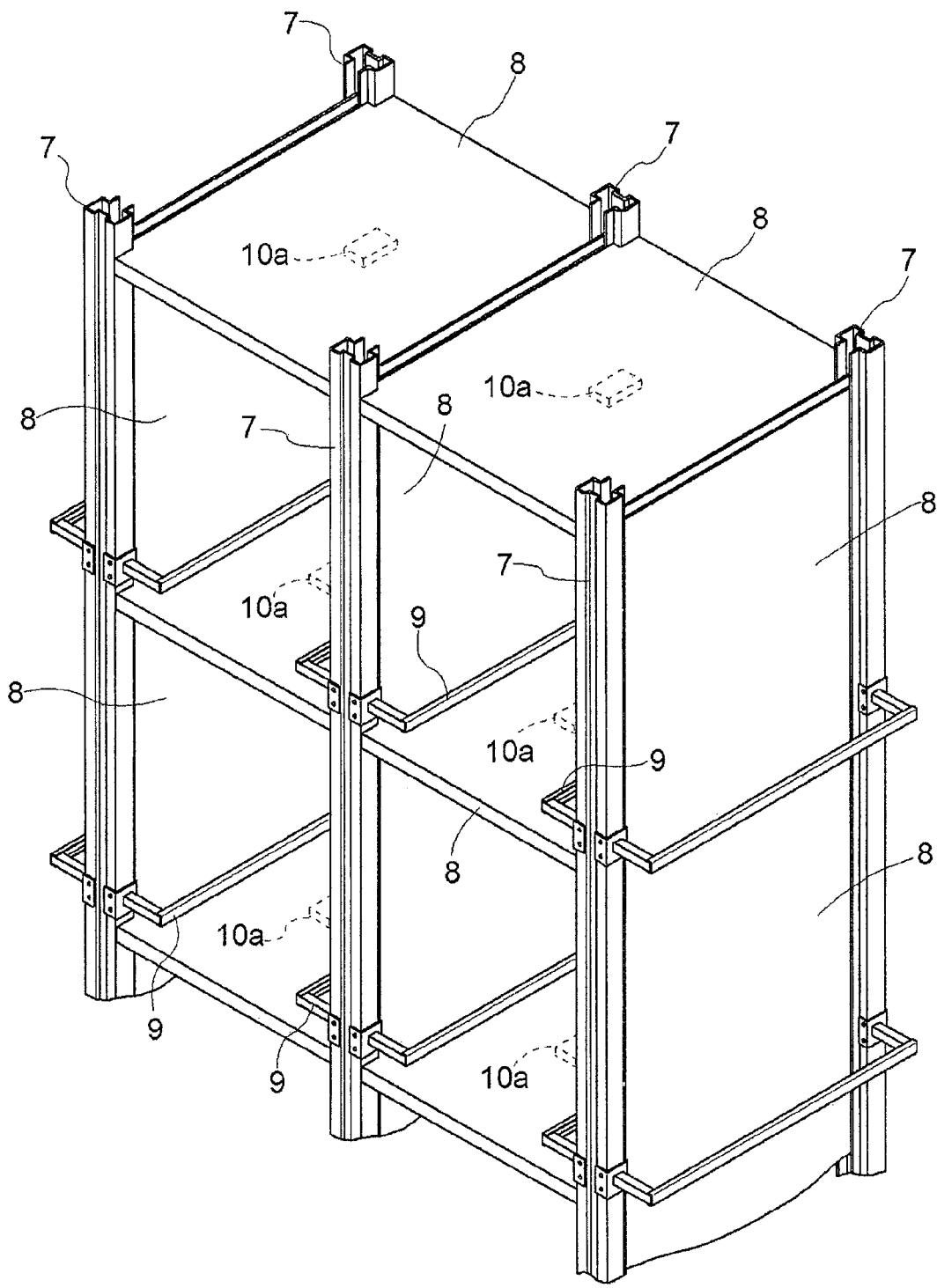
FIG. 2 is a partial enlarged perspective view of the article storing rack.

The article storing racks 3 comprise a plurality of article storing sections 5, where articles can be freely stored, being provided in the width and up and down directions of the racks. As shown in FIG. 2, a plurality of pairs of supports 7, which are aligned in a front-back direction to each other, are provided in the width direction of the rack; and a plurality of brackets 9 are attached to each of the pair of supports 7, respectively, being spaced at intervals in an up and down direction to form a plurality of storing sections 5. Articles to be stored in the sections 5 are held there in a condition that both sides of the articles in the width direction of the rack are mounted on the brackets 9 attached on a pair of supports 7 that are adjacent to each other. That is to say, the storing section 5 functions as an article holding section 4.

The side surfaces in the rack width direction, the upper and lower surfaces, and the back surfaces of each storing section 5 are each surrounded by fire proof panels 8 made of flame retardant material, such as rock wool. In this way, the article storing sections being adjacent to each other in the up and down or left and right directions are partitioned from each other, so that when a fire occurs in an article, the spread of fire to the adjacent storing sections 5 can be prevented. On each fire proof panel 8 on the upper surface of each storing section 5, a fire sensor 10a is provided to detect an occurrence of fire occurrence in the article storing section, by which in any case of a fire occurring in the article stored in the article storing section 5, any heat or smoke caused by the fire can be detected.

[Fire Detecting Means]

The fire sensor 10a in each storing section 5 is connected to a fire detecting apparatus 10b (see FIG. 8) in an identifiable manner, for example, by making connecting terminals thereof different from each other. When a fire sensor 10a detects a fire in an article storing section 5, the fire detecting apparatus 10b identifies which fire sensor 10a this is, thus recognizing the article storing section 5 where the fire occurs (hereinafter, this such article will be referred to as "fired article Wf") from the relationship between this fire sensor 10a and its corresponding article storing section 5. Then, the apparatus outputs information to identify the storing section 5 in which the fire occurred, to a ground side controller 15 (see FIG. 8), which will be explained later, as a fire detecting information.

In this manner, in the present embodiment, the fire detecting means 10 comprises a plurality of fire sensors 10a provided in each article storing section 5 and the fire detecting apparatus 10b connected to the sensors in an identifiable manner. The fire detecting means 10 is constituted to detect an occurrence of fire in the manner of identifying the fired article holding section in which a fired article Wf is being held, from amongst the plurality of article storing sections 5 functioning as the article holding section 4.

[Article Loading Section]

In the width direction of the pairs of article storing racks 3, at a position at one of the ends of the rack and adjacent to the end facing is the sure direction, a pair of article loading sections 6 is provided as the article holding section 4. At a position at one of the ends of the first storing rack 3a and adjacent to the end in its width direction, an article loading on/off section 6a is provided as the article holding section 4 for holding an article to be stored in the article storing racks 3 or an article to be loaded from the article storing racks 3 (hereinafter, referred to normal article Wn). Further, at a position at one of the ends of the second storing rack 3b and adjacent to the end in its width direction, a submerged article loading section 6b is provided as an article holding section 4 for holding an article on fire Wf.

The article loading on/off section 6a is set at one of the ends of loading-on conveyer 14 for transferring the normal article Wn between the facilities and the outside; the normal article Wn is loaded with the aid of the stacker crane 1. The article loading on/off section 6a holds a normal article Wn at the same height as that of the lowest article storing section 5 of the article storing racks 3.

Figure 5:
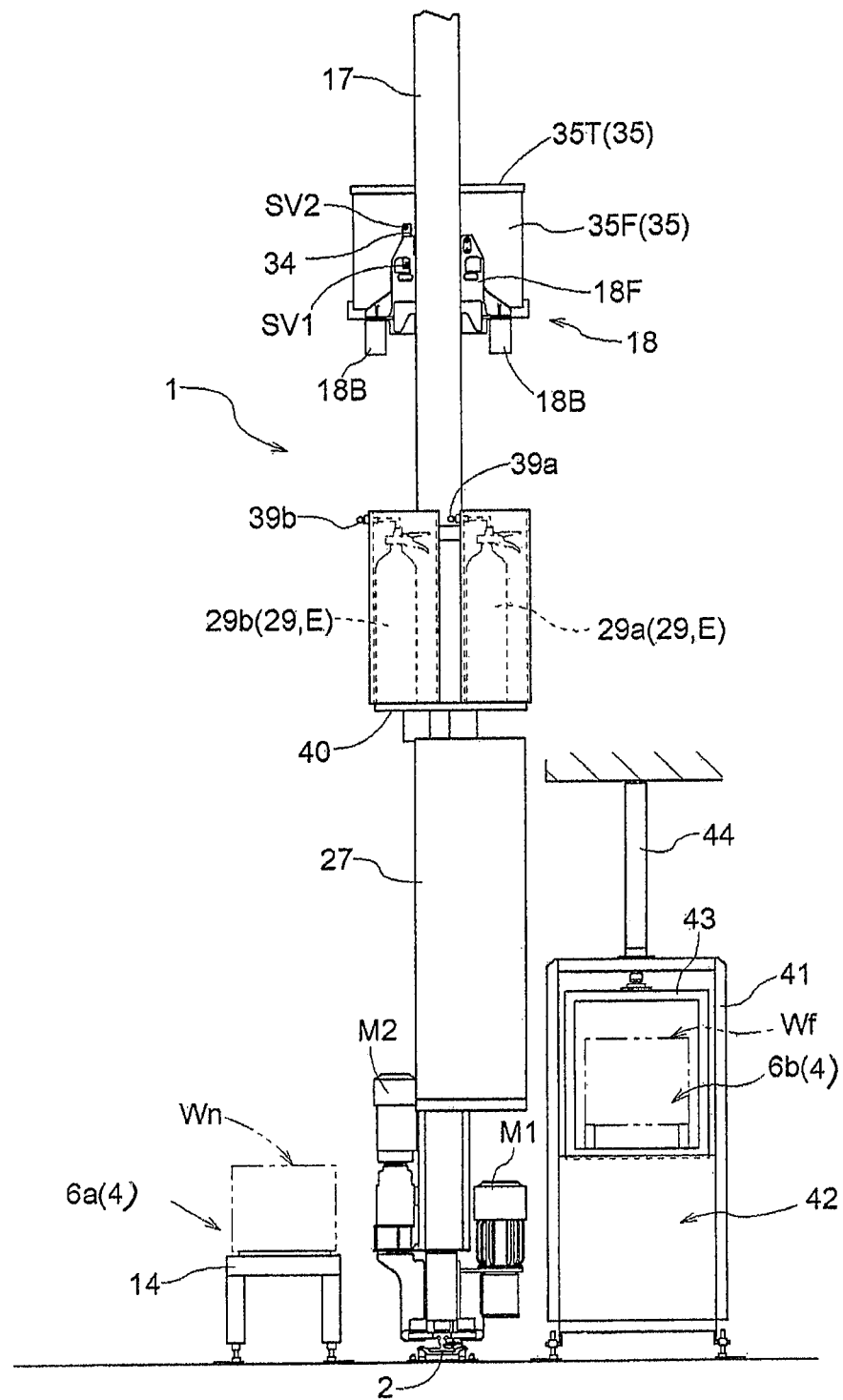
FIG. 5 is a front view of the stacker crane.

As shown in FIG. 5, the submerged article loading section 6b is set above a water bath 42, which is for extinguishing an article on fire Wf, at which an article on fire Wf is transferred to a loading frame 43 above the water bath 42 with the aid of the stacker crane 1. The submerged article loading section 6b holds the fired article Wf at an intermediate height between the holding height of the lowest storing section 5 of the article storing rack 3 and the holding height of the second lowest storing section 5. That is to say, the submerged article loading section 6b is set at a position higher than the article loading section 6a.

The loading frame 43 is suspended and supported by the bottom end of the rod in a cylinder 44, which is provided in the upper portion of a box 41 of the frame structure, so that the frame is freely lifted up and down along a guide rail (not shown) between the transferring height above the water bath 42 and the submerged height in the water bath 42. In this manner, at least one of the plurality of article holding sections 4 is constituted as the submerged article loading section 6b, which works as an article on fire article extinguishment section having a water bath 42 as a fire extinguishing means for the article on fire Wf. Further, at least one of the article loading sections 6 is set as the article on fire article extinguishment section.

[Safety Fence]

Around the end of the travelling path at the article loading section 6 end (hereinafter, referred to as "home position HP") and around the opposite end to the home position HP of the travelling path (hereinafter, referred to as "opposite position OP"), a safety fence 11 is provided in order to prevent the incursion of operators into the travelling path. On the safety fence 11 at the home position HP side, a maintenance door 12, which freely opens or closes the entrance of the safety fence and a door switch 13, functioning as an open/close state detecting means for checking the open/close state of the maintenance door 12, are provided. The door switch 13 is a limit switch, which turns ON when the maintenance door 12 is closed and OFF when the door is at a position between the closed position and an open position. Thereby, the door switch 13 can detect whether the maintenance door 12 is opened.

Figure 8:
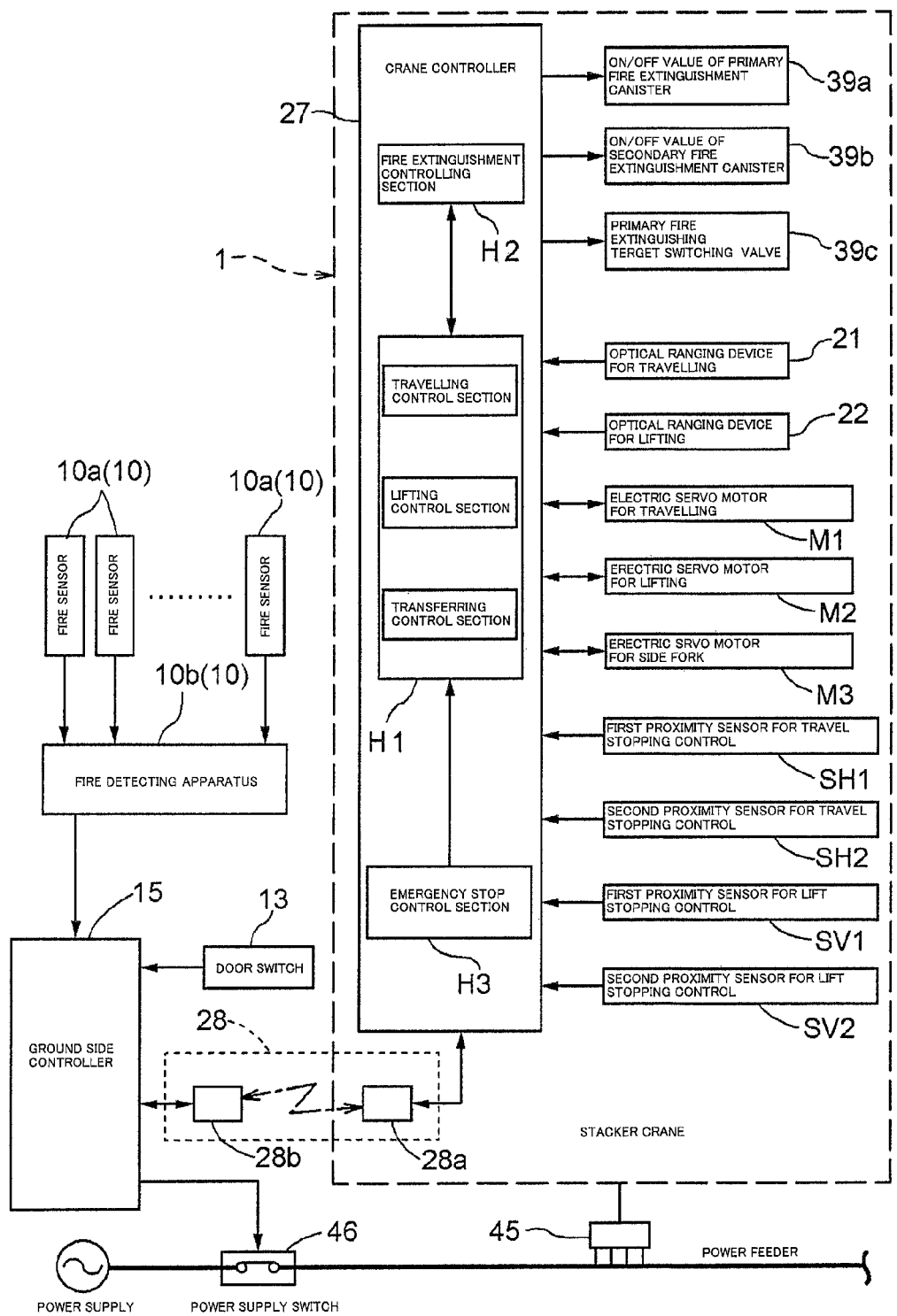
FIG. 8 is a block diagram for controlling the facilities.

As shown in FIG. 8, the door switch 13 is connected to a ground side controller 15, which is explained below. When the door switch 13 is switched from ON to OFF, the ground side controller 15 judges that the maintenance door 12 has been operated to open, and then controls a power supply switch 46, which is for switching between the conditions of supplying or not supplying power to the power supplying rail for the supplying of power to the stacker crane 1 via a current collecting brush 45, to switch the condition into one in which the power supply is interrupted. Thereby, in cases when an operator opens the maintenance door 12 to get in the travelling path during the time when the stacker crane 1 is being operated, the operation of the stacker crane 1 is made to stop at the point of opening the maintenance door.

[Stacker Crane]

Figure 3:
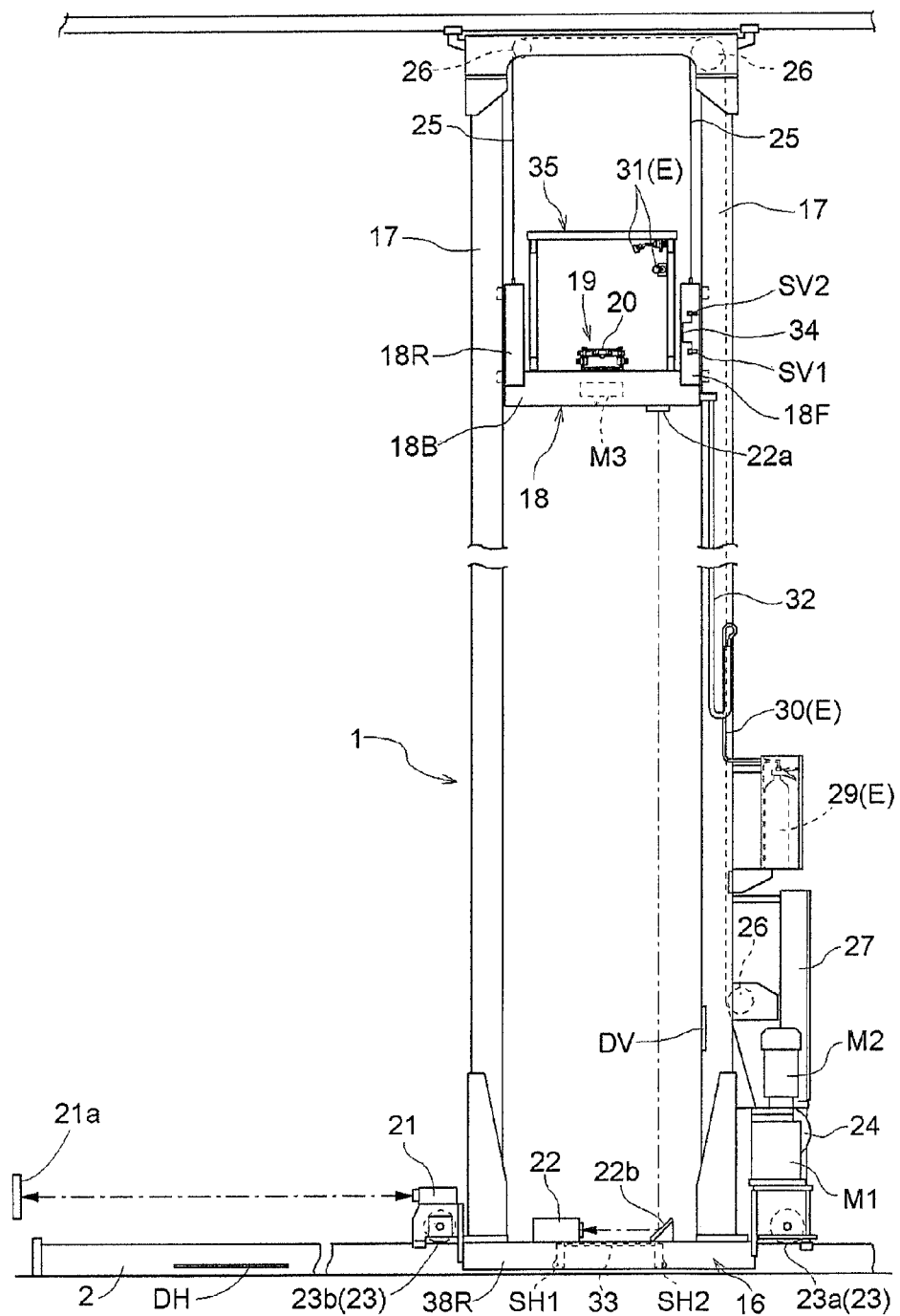
FIG. 3 is a side view of the stacker crane.

As shown in FIG. 3, the stacker crane 1 comprises a carriage 16, an lift 18, which is freely liftable up/down along a lifting path provided between the front and back pair of masts 17 stood from the carriage 16, and an article transferring apparatus 19, which is liftable up/down with the lift 18 in a united manner, the article transferring apparatus 19 having a slide fork 20 which is provided between the retired position on the travelling path side and the protruded position protruding at the article storing racks 3 side in a freely protruding/retiring manner, functioning as an article mount body for mounting and supporting a normal article Wn or an article on fire Wf. By the traveling operation of the carriage 16 along the travelling path and the lifting up/down operation of the lift 18 along the article lifting path, the normal article Wn or the fired article Wf can be freely transferred between the article holding sections 4 by the article transferring apparatus 19 with an article storing section 5 and an article loading section 6 functioning as the article holding section 4. It should be noted that the direction that the carriage travels from the home position HP to the opposite position OP is taken to be forward travel and the carriage travels in the opposite direction is taken to be backward travel. In the following explanation, the terms of the forward, backward, left and right directions are explained referring to the forward travel direction of the stacker crane 1 as the referenced direction.

[Optical Ranging Means]

As shown in FIGS. 1, 3, and 8, a first optical ranging device 21 is provided at the end portion of the home position HP side of the travelling carriage 16 of the stacker crane 1 as an optical ranging means for detecting a distance between a first reference position and the stacker crane 1 on the travelling path. The first optical ranging device does this by projecting a measurement light along the travelling path. Further, a second optical ranging device 22 is provided on the travelling carriage 16 as an optical ranging means for detecting a distance between a second reference position and the lift 18 on the lifting path. It does this by projecting a measurement light along the lifting path.

The first reference position is set at the position of a reflection plate 21a located in the vicinity of the home position HP along the travelling path, while the second reference position is set at the position of a reflection plate 22a provided on the bottom of the lift 18. It should be noted that the second optical ranging device 22 is provided at a position in which the projected light is directed in a lateral direction on the carriage 16, with the optical axis of the light projected from the second optical ranging device 22 changed into the vertical direction by the relay reflecting plate 22b on the carriage 16, then the light is reflected by the reflection plate 22a on the lift 18 to go back to the second optical ranging device 22 via the same optical path.

[Driving Means]

As shown in FIG. 3, at the end portion of the opposite position of the carriage 16, a first electric servo motor M1 for driving the carriage 16 and a second electric servo motor M2 for lifting up/down the lift 18 are provided. Also, a third electric servo motor M3 is provided on the lift 18 as a means for driving the slide fork 20 to make it protruded/draw back.

The first electric servo motor M1 drives to rotate the front driving wheel 23a of a pair of front and rear travelling wheels 23 provided on both the front and rear end portions of the carriage 16 in forward and reversed directions to make the carriage 16 travel along the travel rail 2. The rear wheels on the rear end portion of the carriage 16 are cam wheels 23b. The second electric servo motor M2 works to wind up/out a pair of lifting wires 25, which suspend and support the lift 18 guided by a plurality of guide sieves 26, by driving a winding up drum 24, which is rotatably provided around the lateral axis of the front mast 17, in forward and reversed directions so as to lift the lift 18 up/down along the lifting mast 17. The third electric servo motor M3 used for the slide fork works to protrude the slide fork 20 from a retired position to a protruded position or to draw it from a protruded position to a retired back position via a driven force transmission mechanism (not shown).

[Fire Extinguishing Means]

As shown in FIG. 3, a fire extinguishing means E for freely spraying a fire extinguishing agent is provided on the stacker crane 1. In the present embodiment, the fire extinguishing means E sprays carbon dioxide (gas) as a fire extinguishing agent. The fire extinguishing means E includes two carbon dioxide gas canisters 29 filled with liquefied carbon dioxide gas, pressure-proof hoses 30 connected to the canisters, and three nozzles 31 connected to the top end of the pressure-proof hoses 30 and attached to the hood 35 of the lift 18. The carbon dioxide gas canisters 29 are contained in a canister case 40 (see FIG. 5) attached to the front mast 17 in a fixed condition with the aid of fittings (not shown). The pressure-proof hoses 30 are connected to the lift 18 are internally packed within a cable bare 32 attached to the front mast 17, so that they do not impinge on the lifting up/down operation of the lift 18.

Figure 4:
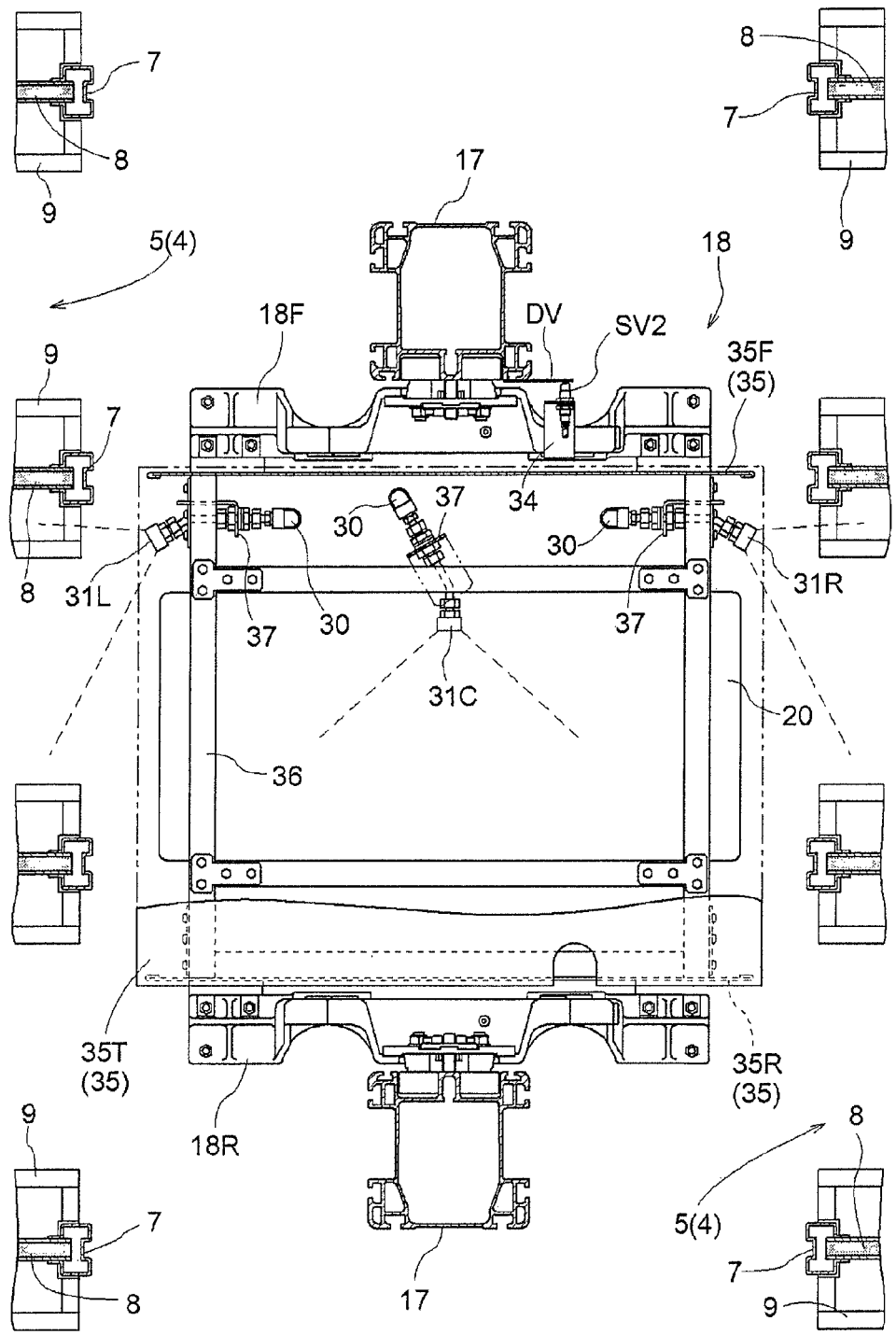
FIG. 4 is a partial plan view of the lift.
Figure 6:
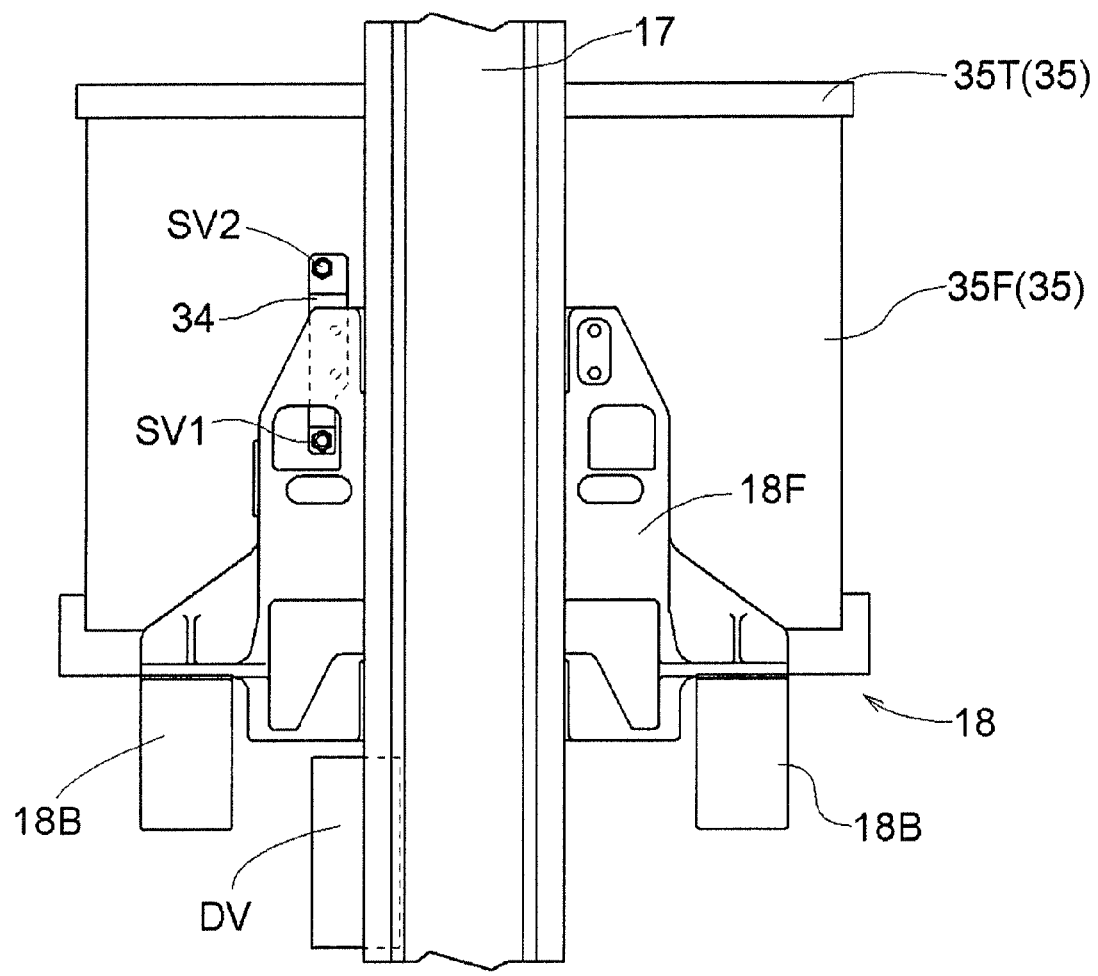
FIG. 6 is a front view of the lift.

As shown in FIGS. 4 to 6, the lift 18 comprises a pair of front and rear lifts 18F and 18R, which have a plurality of guide rollers engaged with guide grooves formed along the up and down direction on the lifting mast 17 which enable the lifts to be lifted up and down along the mast 17 with the aid of the pair of lifting wires 25, and a pair of left and right elongated bottom frames 18B which are provided opposite to each other in the left and right direction with a space between them and along a back and forth direction. The front and rear lifts 18F and 18R and the bottom frame 18B are connected to each other.

A hood 35 of the lift 18 has a solid grating hood frame 36, where a plurality of frame members made of steel are framed in the vertical and horizontal directions. The hood frame 36 is fixed on the pair of left and right bottom frames 18B with the aid of bolts to secure it on the lift 18. The hood 35 has a flat type front side panel 35F and rear side panel 35R, which are disposed in a longitudinal direction at both front and rear side surfaces of the hood frame 36, and a flat type top panel 35T disposed on the top surface of the hood frame 36 in a flat manner. Not depicted in the drawings, a pair of left and right divided bottom plates are provided for preventing the entrance of air into the hood 35 through the pair of left and right bottom frames 18B so that the protruding operation of the slide fork 20 is not interfered with. Thereby, a normal article Wn or an article on fire Wf mounted and supported by the slide fork 20 of the transfer apparatus 19 is conveyed in a condition in that the front, rear, top and bottom of the article is covered with the hood.

A pair of left and right nozzles are provided inside of the hood 35, i.e. nozzle 31L directed towards the first rack and nozzle 31R towards the second rack, which function as an external fire extinguishing apparatus for spraying carbon dioxide gas against an article on fire Wf held in the storing section 5. Also provided there is a nozzle 31C directed inside functioning as an internal fire extinguishing apparatus for spraying carbon dioxide gas against an article on fire Wf held in the hood 35 of the lift 18. These nozzles are attached to the hood frame 36 on the rear surface of the top panel 35 T in a fixed manner with the aid of bracket 37.

As shown in FIG. 5, two carbon dioxide gas canisters 29 comprise a first canister 29a which is filled with a certain amount of carbon dioxide gas allowing for the spraying of the gas for a first predetermined time period (10 seconds in this embodiment) against the article on fire Wf held in the storing section 5, and a second canister 29b which is filled a certain amount of fire extinguishing agent, i.e. carbon dioxide gas, allowing for the spraying of the gas for a second predetermined time period (10 seconds as well in this embodiment) against the fired article Wf held in the hood 35 of the lift 18.

Electro-magnetic solenoid type on-off valves 39a for primary fire extinguishment and 39b for secondary fire extinguishment are provided in the first and second canisters 29a and 29b, respectively. The on-off operation of these is controlled by the fire extinguishing control executed by a crane controller 27 (see FIG. 8). The nozzle 31L directed towards the first rack and the nozzle 31R towards the second rack are attached to each of the ends of agent supplying paths branching out from the pressure-proof hose 30, which is connected to the first canister 29a via the on-off valve 39a for the primary fire extinguishment, via a switching valve 39c (see FIG. 8) geared to the primary object to be extinguished. When the fire extinguishing control is initiated, the valve 39c is switched in accordance with the position of the article storing rack 3, to which the storing section 5 of the article on fire Wf belongs, so that either one of the nozzle 31L directed towards the first rack or the nozzle 31R directed towards the second rack can be supplied with the carbon dioxide gas from the first canister 29a.

In this manner, the fire extinguishing means E is provided on the stacker cane 1 as functioning the movable body, and is constructed such that it can freely spray the fire extinguishing agent, i.e. carbon dioxide, against a fired article Wf held in the storing section 5 and a fired article Wf in the stacker crane 1.

[The Object to be Detected and the Apparatus for Detecting the Same for the Travelling Operation]

Figure 7:
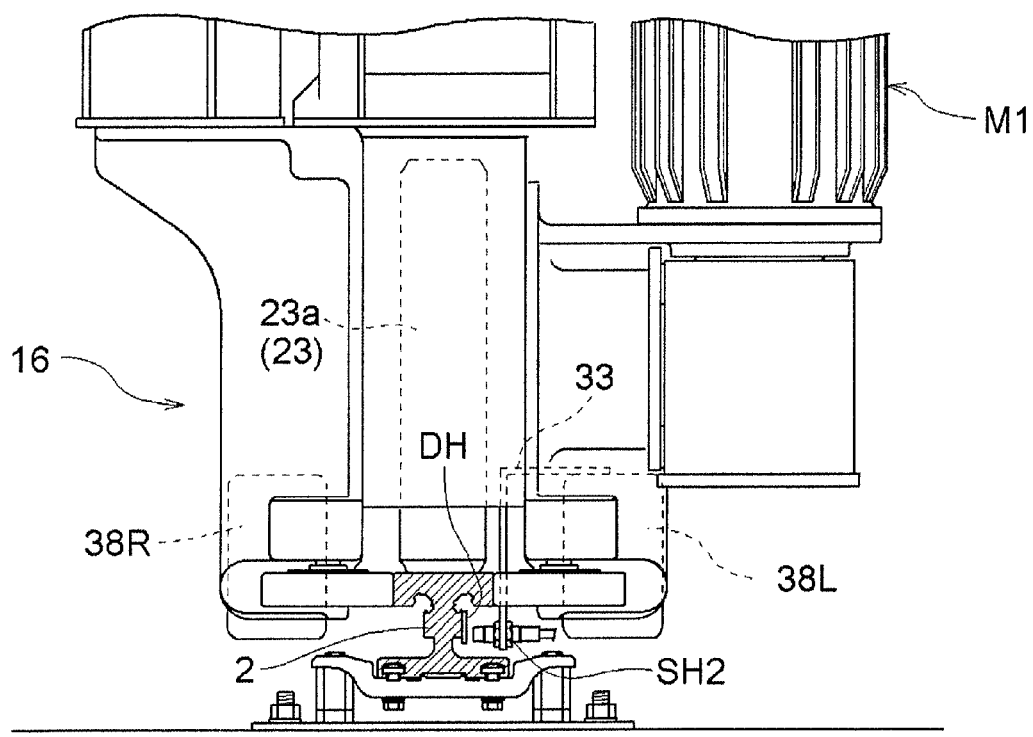
FIG. 7 is a front view of the travelling carriage.

As shown in FIGS. 3 and 7, first and second proximity sensors SH1 and SH2 are provided on the carriage 16 for stopping the travelling of the carriage. The carriage 16 comprises a pair of left and right frames 38L and 38R positioned on both sides of the traveling rail 2. The first and second proximity sensors SH1 and SH2 are supported under the lower end of a sensor bracket 33, which has an L-shape viewed from the traveling direction, and is provided at the center portion of the left side frame 38L. The proximity sensors SH1 and SH2 are constituted such that the distance of separation in the left/right direction between the sensors and an elongated travel stopping dog DH for stopping the travelling of the carriage, which is provided at an intermediate position in the height direction above the travelling rail 2 along the rail, is adjusted.

The travel stopping dog DH is provided on the travel rail 2 such that it corresponds with the submerged article loading section 6b functioning as an article holding section 4 and functions as the object to be detected used for the stopping control. The proximity sensors SH1 and SH2 work to detect the presence of the travel stopping dog DH by a detecting action on the travel stopping dog DH functioning as the object to be detected for use in stopping control. Further, the travel stopping dog DH functioning as the object to be detected is provided only for the submerged article loading section 6b, which is functioning as the article holding section 4 provided on the fired article extinguishing section.

[The Object to be Detected and the Apparatus for Detecting the Same for Lifting Operation]

As shown in FIGS. 3, 4 and 6, on the lift 18 is provided with first and second proximity sensors SV1 and SV2 are provided for controlling the lifting stop. These proximity sensors SV1 and SV2 are supported by vertical plate portions on the upper and lower sections of the sensor attaching bracket 34. The bracket is folded so as to form a convex portion in a traveling direction viewed from the left side, provided on the front lift 18F of the lift 18. The proximity sensors SV1 and SV2 are constituted such that the distance of separation between the sensors and an elongated lift stopping dog DV being provided along the front mast 17 is adjusted.

The lift stopping dog DV is provided on the front mast 17 corresponding to the submerged article loading section 6b functioning as the article holding section 4, and functions as the object to be detected in the lifting operation used for controlling the stopping of lifting. The proximity sensors SV1 and SV2 function as the apparatus for detecting the object to be detected used in controlling the stopping of lifting, as they function to detect the presence of the lift stopping dog DV, which is that functioning as the object to be detected in the lifting operation that is used for controlling the stopping of lifting, by performing a detecting action on the lift stopping dog DV. Further, the lift stopping dog DV functioning as the object to be detected is provided solely in respect to the submerged article loading section 6b, which is the article holding section 4 set as the article on fire article extinguishment section, and therefore, it is provided on the front mast 17 so as to correspond to the lifted height of the lift 18 at the timing when the transferring article on fire Wf to the submerged loading section 6b has just been started.

[Controlling Structure]

The operation of the stacker crane 1 is controlled by the ground side controller 15 (see FIG. 1) on the floor surface in the vicinity of the home position HP of the travelling path and a crane controller 27 (see FIG. 3) on the lower portion of the front mast 17 of the stacker crane 1.

As shown in FIGS. 1 and 8, the ground side controller 15 and the crane controller 27 can communicate to each other in a wireless manner using an optical communication apparatus 28 for sending/receiving communication light along the travelling path. The optical communication apparatus 28 comprises a ground side transmitting and receiving section 28b provided on the edge of the travelling path and a crane side transmitting and receiving section 28a, functioning as a movable body side transmitting and receiving device that is provided on the carriage 16 of the stacker crane 1, to transmit and receive the communication light along the travelling path.

A conveying command is sent from the ground side controller 15 to the crane side controller 27 via the optical communication apparatus 28. The conveying command is sent designating dispatch and designation article holding sections 4, with the crane controller 27 then controlling the travelling, lifting and transferring operations of the stacker crane 1 according to the conveying command sent from the grand side controller 15.

[Ground Side Controller]

The ground side controller 15 maintains a first control state during the time when no fire on any normal article Wn is detected by the fire detecting means 10. Under the first control state, the ground side controller 15 sends a command for conveying normal articles Wn between a plurality of article holding sections 4, i.e. between the article loading on/off section 6a and an article holding section 5 to crane controller 27, in order to perform the loading and unloading operations of normal articles Wn in accordance with a command from the higher management apparatus. Note that after it is switched to the second control state, no transferring command would is sent from the ground side controller 15 to the stacker crane 1.

There are four types of conveying commands, which have an article empty conveying command to a dispatching article holding section 4 (in case of loading, the article loading on/off section 6a), a command for scooping an article at the dispatching article holding section 4, a command for conveying an article to a designated article holding section 4 (in case of loading, to the article holding section 5), and a command for unloading the article at the designated article holding section 4. The ground side controller 15 sends an article empty conveying command first, then the controller successively sends the rest of three commands to the crane controller 27 every time it receives information that each of the commands from the crane controller 27 has been completed.

[Crane Controller]

The crane controller 27, as shown in FIG. 8, has a conveying control section H1, a fire extinguishment controlling section H2 and an emergency stop control section H3 in a programmed format; with the optical communicating apparatus 28 and other input/output devices being connected thereto. The crane controller 27 maintains the first control state until it receives control state switching information, which is output from the ground side controller 15 when the operation mode of the ground side controller 15 is changed from the first control state to the second control state. That is to say, the crane controller 27 is switched from the first control state to the second control state almost simultaneously when the ground side controller 15 is changed from the first control state to the second control state when a fire in the normal article Wn is detected by the fire detecting means 10. The construction of each controlling section will be explained below.

[Conveyance Controlling Section]

Under the first control state, the conveying control section H1 commands the travel control section and the lift control section to control the traveling operation of the carriage 16 and the lifting operation of the lift 18 when the article empty conveying command or the article conveying command is dispatched. In other words, the travelling control of the carriage 16 and the lifting control of the lift 18 are executed in accordance with the distances detected by the optical ranging apparatus for travelling 21 and the optical ranging apparatus for lifting 22 such that the position of the transferring apparatus 19 of the stacker crane 1 in the travelling path and the lifting path corresponds to the target travelling and lifting position, which are set for the article holding section 4 targeted for article conveyance, that is the article loading on/off section 6a in the case of the article empty conveying command, or the storing section 5 in the case of the article conveying command.

Figure 9:
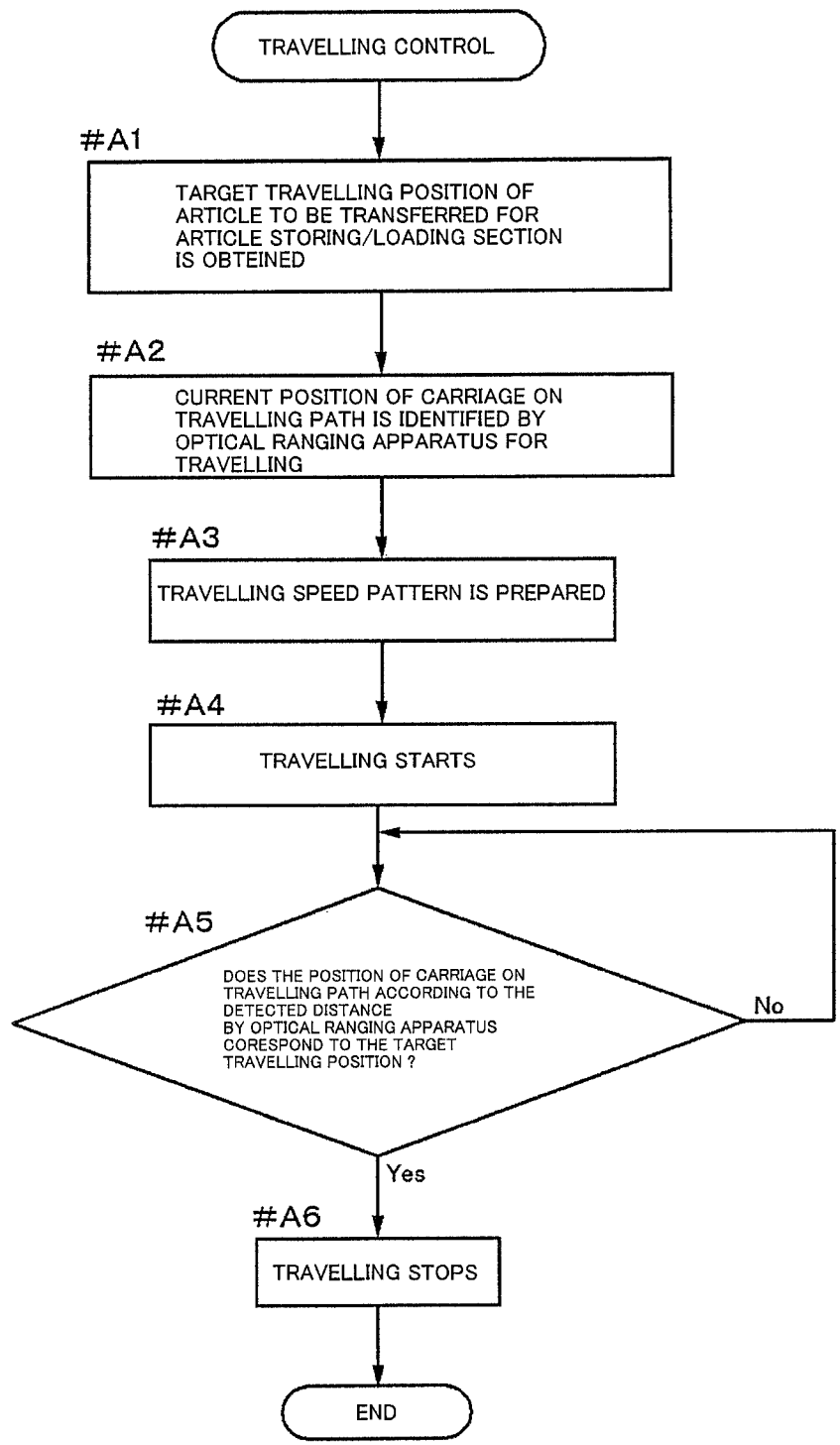
FIG. 9 is a flow chart for travel controlling of the carriage.

As shown in the flow chart of FIG. 9, once the travelling control is executed, first a target travelling position is obtained for the article that is transferred, i.e. the article loading on/off section 6a or the storing section 5 (#A1). Then, the current position of the stacker crane 1 on the travelling path is identified by the optical ranging apparatus for travelling 21 (#A2). Then, a travel speed pattern (see FIG. 20) is prepared on the basis of the necessary travel distance from this current position to the target position, the set lower speed, and the set upper speed (#A3). Next, according to this pattern, a speed command is output to the electric servo motor M1 used for the travelling of carriage (#A4). During the travelling operation, the actual travel speed is calculated from the rate of change of the position on the travelling path in accordance with the distance detected by the optical ranging device 21 for travelling; and a feedback control is performed so as to make the actual travelling speed to the value shown in the travel speed pattern. The travelling operation is continued in such a manner. When the position of the carriage on the travelling path based on the distance detected by the optical ranging device 21 for travelling corresponds to the target position, the carriage is stopped (#A5).

For the lifting operation as well, a lifting speed pattern is prepared on the basis of the necessary lifting distance obtained from the current position identified by the optical ranging device 22 for lifting and the target lifting position; the actual lifting speed is calculated from the rate of change of the position on the lifting path on the basis of the distance detected by the optical ranging device 22 for lifting; a feedback control is performed so as to make the actual lifting speed correspond to the value shown in the lifting speed pattern. The lifting operation is continued and thus is stopped when the position of the lift on the lifting path detected by the optical ranging device 22 for lifting meets the target lifting position.

Under the first control condition, the conveying control section H1 commands the transferring control section function to control the protruding out/retiring back operation of the transferring apparatus 19 and also the lifting operation of the lift, when a scooping command or a loading off command is dispatched. That is to say, when the stacker crane 1 has been stopped at the target travel position for the article holding section 4 targeted for article conveyance, the scooping or loading off control is executed which constitutes an article transfer control for transferring normal articles Wn between the article holding section 4 and the stacker crane.

Figure 10:
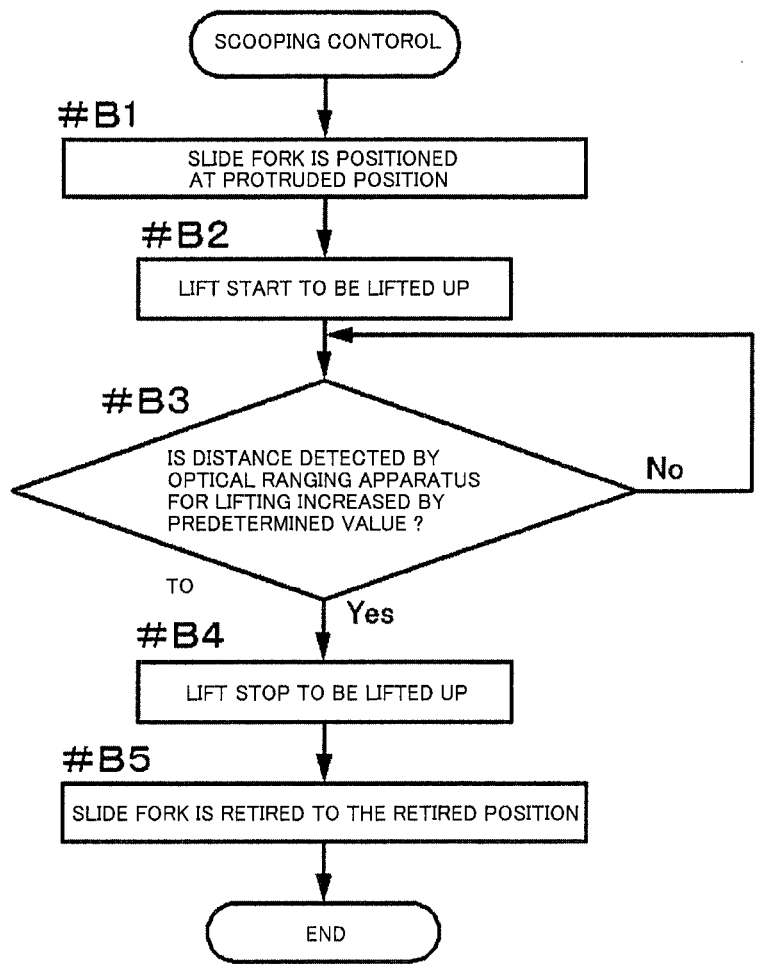
FIG. 10 is a flow chart for controlling the scooping operation.

As shown in the flow chart of FIG. 10, when the scooping operation is performed, the amount of protrusion is controlled on the basis of the feedback signal from the electric servo motor M3 used for the slide fork such that the slide fork 20 is positioned at a protruded position which is under the normal article Wn by protruding the transferring apparatus 19 (#B1). Maintaining this state, a feedback control is performed to lift the lift 18 up so that the distance detected by the optical ranging device 22 used in lifting changes (increases) by only a predetermined amount (#B2 to #B4). Finally, the amount to be retired is controlled on the basis of the feedback signal from the electric servo motor M3 used for the slide fork 20 such that the slide fork positioned at the retired position by the drawing back of the transferring apparatus 19 (#B5).

Figure 11:
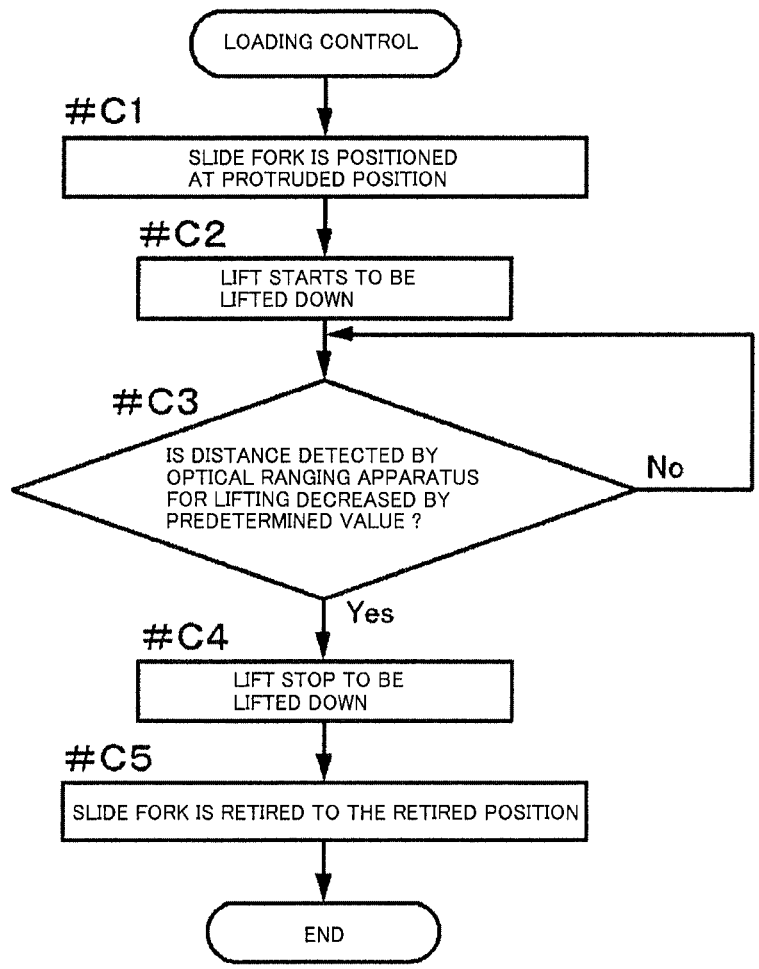
FIG. 11 is a flow chart for controlling the carrying down operation.

As shown in the flow chart of FIG. 11, when the unloading operation is performed, the amount of protrusion is controlled on the basis of the feedback signal from the electric servo motor for slide fork M3 used for the slide fork 20 is positioned at a protruded position under the normal article Wn by protruding the transferring apparatus 19 (#C1). Maintaining this state, a feedback control is performed to lift the lift 18 down so that the distance detected by the optical ranging device 22 used in lifting changes (decreases) by only a predetermined amount (#C2 to #C4). Finally, the amount to be retired is controlled on the basis of the feedback signal from the electric servo motor M3 used in the slide fork that the slide fork 20 is positioned at the retired back position by retiring back the Transferring apparatus 19 (#C5).

In this manner, under the first control state, when the ground side controller 15 sends commands, such as an article empty transferring command, scooping command, an article transferring command, or an article loading off command, via the optical communication apparatus 28, the article transferring control section H1 of the crane controller 27 performs the travel control, the lifting control, and the transferring control, and thereby the loading and unloading on/off operation for a normal article Wn by conveying/transferring them between the plurality of article holding sections 4 (i.e. between the article loading section 6a and the storing section 5) can be achieved. Therefore, according to the present embodiment, the ground side controller 15 functions as a ground side controlling apparatus, while the crane controller 27 functions as a movable body side controlling apparatus; and the movable body controlling means comprises the ground side controller 15 and the crane controller 27.

[Fire Extinguishing Controlling Section]

Once a fire occurs on the normal article Wn stored in the storing section 5 and is detected by the fire detecting means 10, the fire extinguishing controlling means, which is programmed in the fire extinguishment controlling section H2 in the crane controller 27, operates the fire extinguishing means E. The transfer controlling means H1 and the fire extinguishing controlling means H2 are constituted such that their control operations are freely associated to each other on the basis of information obtained from the fire detecting means 10.

That is to say, the fire extinguishing control section H2 is constituted such that when an occurrence of fire is detected by the fire detecting means 10, the fire extinguishing control section H2 executes a fire extinguishing control that activates the fire extinguishing means E once the performing of a travelling control before fire extinguishing conducted by the conveying control section H1, which is explained below, is completed. Further, when the travelling control before fire extinguishing has been completed, the fire extinguishing control section H2 controls the switching operation of the primary fire extinguishing target switching valve 39c so as to connect the gas supply path from the first canister 29a to the nozzle geared to the article storing rack 3, to which the holding section 5 containing the article in fire article Wf belongs, from either the nozzle 31L for the first rack and the nozzle 31R for the second rack. Then, the primary fire extinguishing control is performed for controlling the operation of the fire extinguishing means E functioning as a fire extinguishment control to spray carbon dioxide gas against the fired article Wf being held in the storing section 5 for a first predetermined time period; and, when the transfer of the fired article Wf (i.e. scooping transfer) from the storing section 5 to the stacker crane 1 is completed by the article in fire transferring control performed by the travel control section H1, the secondary fire extinguishing control for controlling the operation of the fire extinguishing means E, functioning as a fire extinguishment control, is performed so as to spray a carbon dioxide gas against the fired article Wf being held in the stacker craine 1 for the second predetermined time period.

Figure 16:
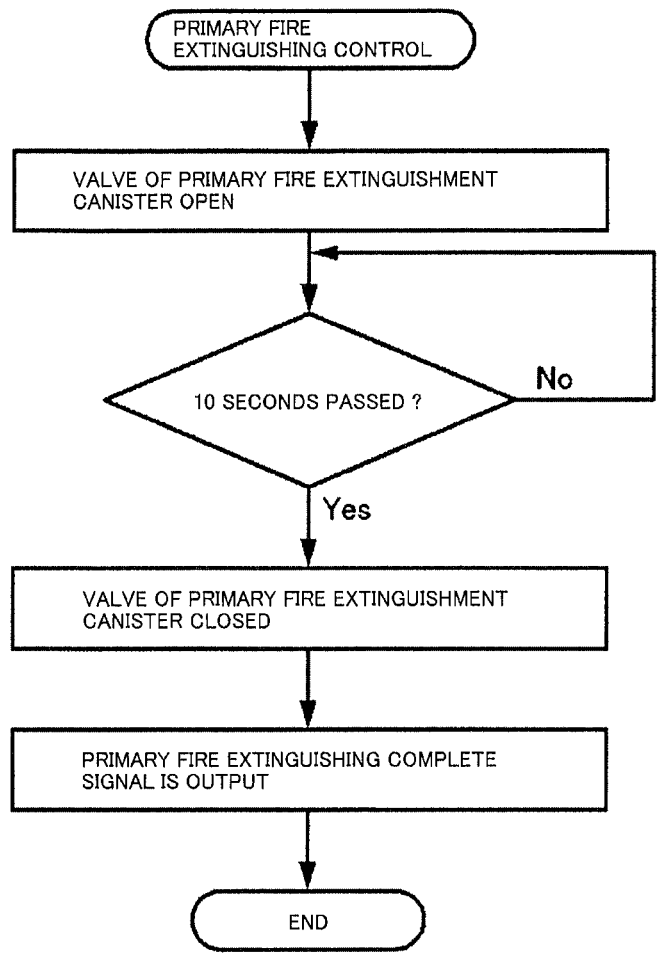
FIG. 16 is a flow chart for the primary fire extinguishment control.
Figure 17:
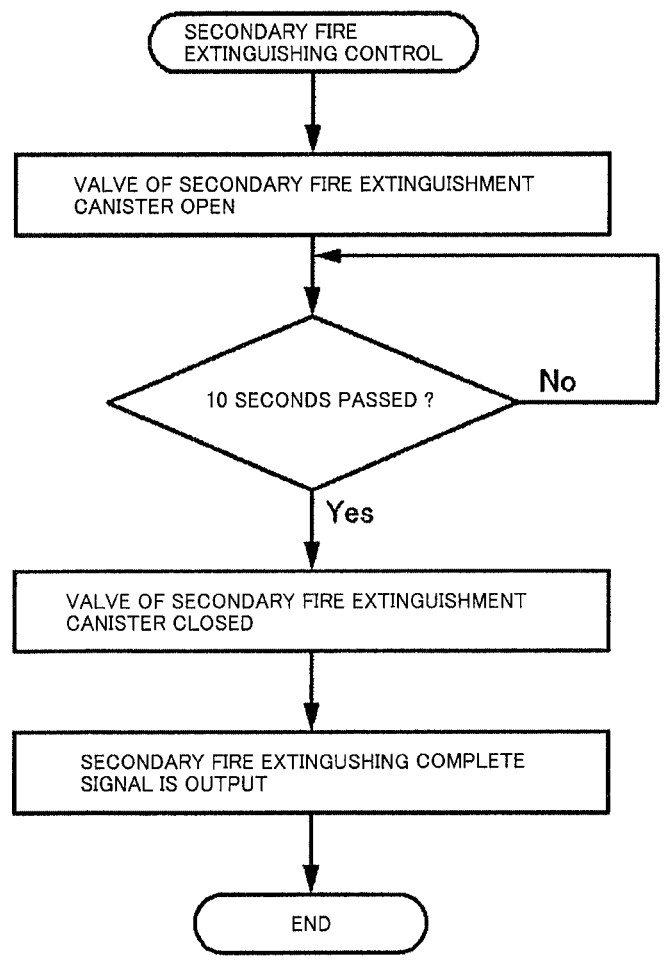
FIG. 17 is a flow chart for the secondary fire extinguishment control.

As shown in the flow chart of FIG. 16, once the primary fire extinguishing control is performed, the on-off valve 39a of the primary fire extinguishment canister is operated to be open, and then the carbon dioxide gas which the first canister 29a is filled with starts to be sprayed from the nozzle 31L directed format to the first rack or the nozzle 31R directed format the second rack, which have been previously switched. After a period of 10 seconds after the valve opens, the on-off valve 39a of the secondary fire extinguishing canister is closed, and then a primary fire extinguishing complete signal is output to the conveying control section H1. In the same manner, when the secondary fire extinguishing control is performed, the on-off valve 39b for secondary fire extinguishing is operated to be open and the carbon dioxide gas which the second canister 29b is filled with starts to be sprayed from the nozzle 31C directed inside of the hood, as shown in FIG. 17. After a period of 10 seconds after the valve opens, the on-off valve 39b of the secondary fire extinguishing canister is closed and then a secondary fire extinguishing complete signal is output to the conveying controlling section H1.

[Emergency Stop Control Section]

Figure 12:
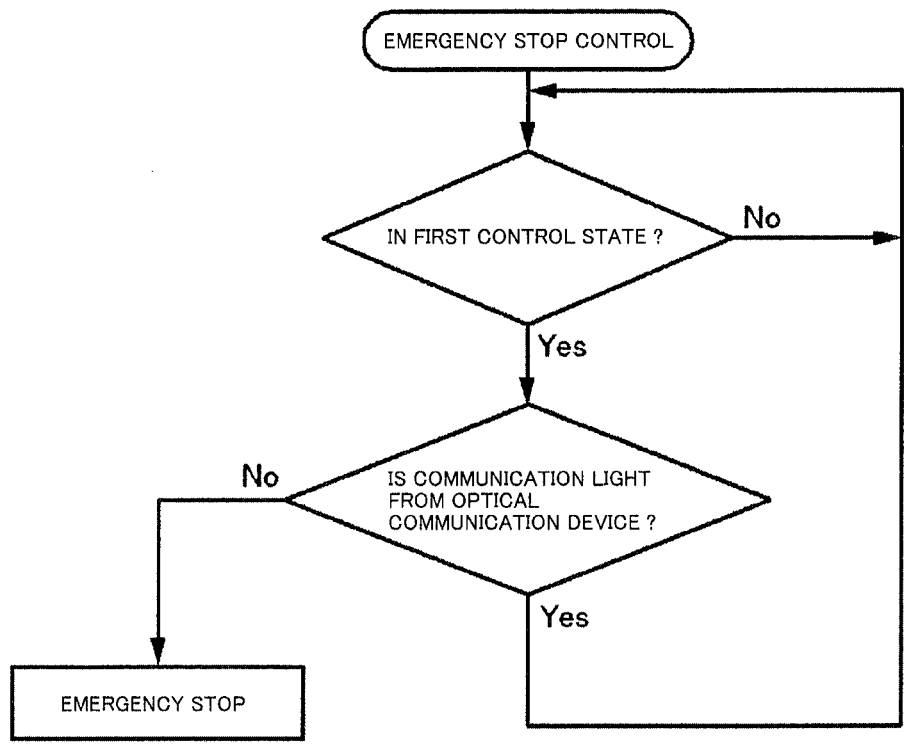
FIG. 12 is a flow chart for emergency stop control.

The crane controller 27 comprises an emergency stop control section H3 in a programmed format which functions as an emergency stopping means by which under the first control state, when a communication light from the optical communication device 28 is interrupted, the travelling operation of the stacker crane 1 is forcibly stopped. That is to say, as shown in FIG. 12, the emergency stop controlling section H3 judges whether it is in the first control state; and whilst in the first control state, monitoring for the presence of the communication light from the optical communication device 28; and if the communication light is interrupted, sends a stopping command to the transfer control section H1, so that no transfer command can be sent from the ground side controller 15. Or, in cases in which some situation occurs by which the complete information cannot be sent from the crane controller 27, the emergency stop control section H3 stops the operation of the stacker in order to prevent any trouble, such as the overrunning of the stacker crane 1.

Figure 13:
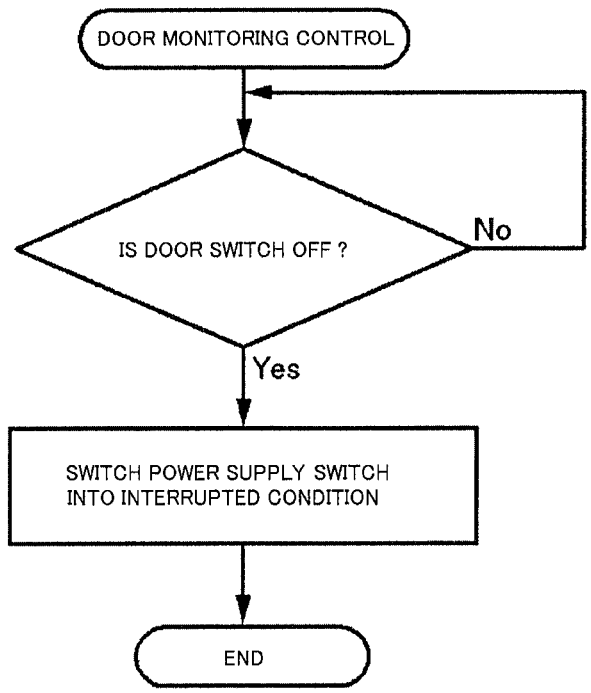
FIG. 13 is a flow chart for door monitoring control.

Furthermore, as shown in the flow chart of FIG. 12, the emergency stop section H3 does not monitor the communication light of the optical communication apparatus 28 when the ground side controller 15 and the crane controller 27 are in the second control state. Thereby, a forcible stop that the stacker crane 1 is prevented even if the communication light is interrupted by the influence of the carbon dioxide gas functioning as a fire extinguishing agent. However, under the second control state, the function of the emergency stop control section H3 is stopped, and thus, when the stacker crane 1 is activated to transfer by the execution of an article on fire transferring control (explained below) is the second control state, the travelling operation and lifting operation cannot be emergency stopped. Thus, as mentioned above, a function is added such that the ground side controller 15 performs the door monitoring control as shown in the flow chart of FIG. 13 to monitor the opening operation of the maintenance door via the door switch; whereby when the maintenance door is open, the power supply switch 46 is switched into an interrupted condition so that the stacker crane 1 is forced to stop due to the interrupting of the power supply required for its operation.

[Fire Prevention Measures]

The ground side controller 15 and the crane controller 27 are constituted such that when the fire detecting means 10 does not detect a fire in the normal article Wn, the first control state is maintained, whilst when the fire detecting means 10 does detect a fire in the normal article Wn, the first control state is changed to the second control state. It should be noted that the ground side controller 15 changes the control state in accordance with fire detecting information from the fire detecting means 10, while the crane controller 27 switches the state when it receives control state switching information from the ground side controller 15.

Under the first control state, the transferring control section H1 of the crane controller 27 performs the travel control of the carriage 16 in accordance with the distance detected by the optical ranging apparatus 21 for travelling and the lifting control of the lift 18 in accordance with the distance detected by the optical ranging apparatus 22 for lifting.

Under the second control state, the transferring control section H1 of the crane controller 27 performs the article in fire article transferring control for controlling the travelling operation and the transferring operation of the stacker crane 1 so as to convey the fired article Wf from the storing section 5 holding the fired article Wf to the submerged loading portion 6b.

The fired article conveying control starts when the primary fire extinguishing control by the fire extinguishment controlling section H2 is completed. Just after the fire extinguishing means E has been activated, moisture in the air condensates due to the carbon dioxide gas of an extremely low temperature to form a misty gas, and therefore, a situation is expected in which the projected light is interrupted such that the optical ranging apparatus 21 for travelling cannot be used. The same applies to the optical ranging apparatus 22 for lifting. Thus, under the article in fire conveying control, the carriage or the stacker crane is stopped at the target travel position or the target lifting position without making use of the distance detected by the optical ranging apparatus 21 for travelling or the optical ranging apparatus 22 for lifting, i.e. without taking in the actual position of the carriage during its travel or the lift during its lifting.

Figure 20:
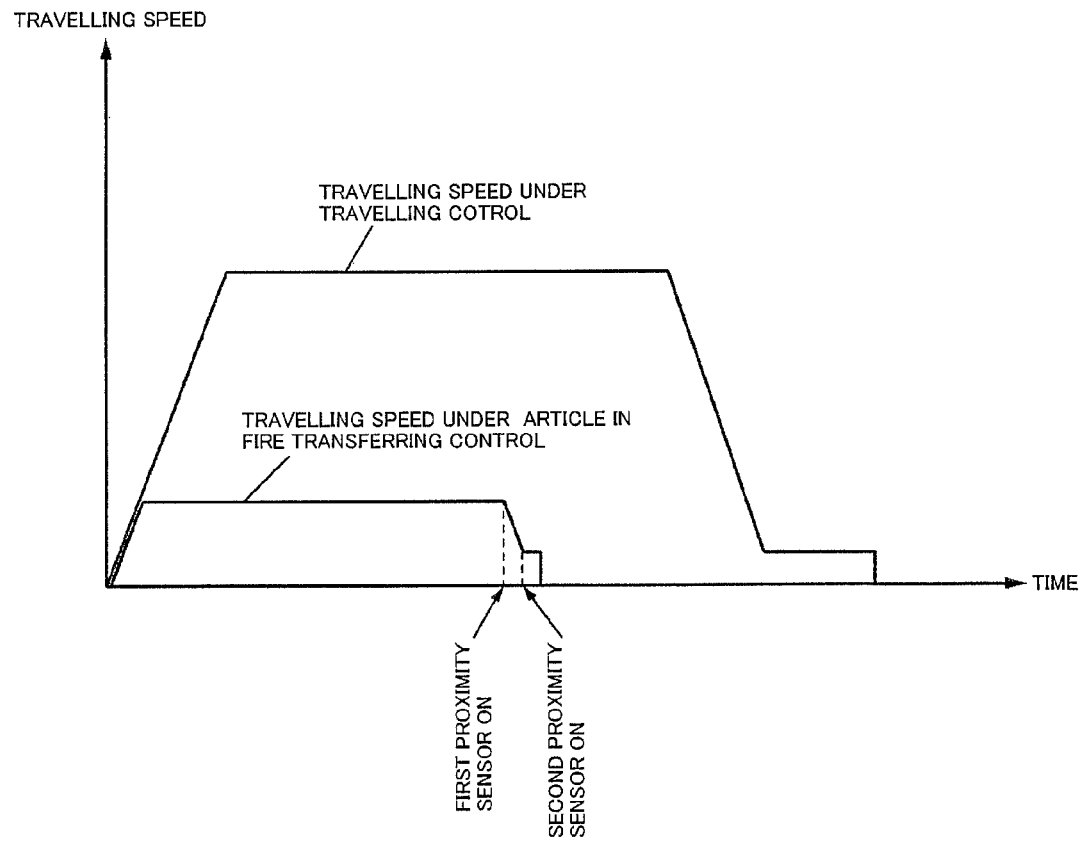
FIG. 20 is a graph showing the difference of the speeds for travelling control and fired article transferring control.

In controlling the travelling operation of the carriage 16 under the second control state, since the actual position of the carriage 16 cannot be figured out, the first proximity sensor SH1 and the second proximity sensor SH2 for stopping the travel of the carriage 16 successively affect detecting actions against the downstream side end portion (opposite position side) in the travelling direction of the travel stopping DH for travelling stopping and thus the smooth decreasing speed and stopping of the carriage 16 can be achieved. That is to say, as shown in FIG. 20, when the first proximity sensor SH1 for travel stopping control detects the end portion of the dog DH for travel stopping, the speed of the carriage starts to be decreased, and when the second proximity sensor SH2 for travel stopping control detects the end portion of the dog DH for travel stopping that comes according to the movement of the carriage 16, a stopping command is sent to the electric servo motor M1. Since the length of the dog DH for travel stopping in the travelling direction is set to be a little longer than the distance between the first and second proximity sensors SH1 and SH2 for travel stopping control, if it is confirmed that both proximity sensors SH1 and SH2 detect the dog DH for travel stopping after the carriage 16 stops, it can be confirmed that the stacker crane 1 is has been stopped appropriately at the target travel position. The same can be applied to the lifting control for the lift 18.

As shown in FIG. 20, the travelling speed of the stacker crane 1 under the second control state is set to be slower than the travel speed of the stacker crane 1 under the first control state, and the lifting speed of the lift 18 under the second control state is to be lower than that in the second control state. Therefore, the travel operation and the lifting operation is performed with a comparatively higher speed using the optical ranging apparatus during the travel control and lifting control before fire extinguishing, however, during the article in fire conveying control after the primary fire extinguishing control has been completed, the traveling operation and the lifting operation are performed with a comparative lower speed for detecting a dog for stopping control.

In the fired article conveying control, the conveying control section H1 of the crane controller 27 controls the travel of the stacker crane 1 such that the stacker crane 1 travels until the first and second proximity sensors SH1 and SH2 for traveling and stopping control detect the dog DH for travel stopping which corresponds to the submerged loading section 6b, and thereby the position of stacker crane 1 in the travelling path is made coincident to the target travel position set to be correspondent with the submerged loading section 6b; and the controller 27 also controls the lifting operation of the lift 18 such that the lift 18 is lifted up/down until the first and second proximity sensors SV1 and SV2 for lifting and stopping control detect the dog DV for lift stopping control which relates to the submerged loading section 6b and thereby the position of the lift 18 in the lifting path is made coincident to the target lifting position set to be correspondent with the submerged loading section 6b.

The conveying control section H1 of the crane controller 27 is constituted such that when transferring the article in fire Wf is transferred from the storing section 5 to the stacker crane 1 in cases when performing the fired article conveying control under the second control state, after the slide fork 20 has been positioned in a protruding position beneath an article in fire Wf by activating the transferring apparatus 19 to protrude, the lift 18 is lifted up for a predetermined time period at a predetermined lifting speed. After this, the control section H1 is constituted to execute a scooping control for the transferring of the article in fire by activating the transferring apparatus 19 to retire so as to position the slide fork 20 in a retired position.

Figure 18:
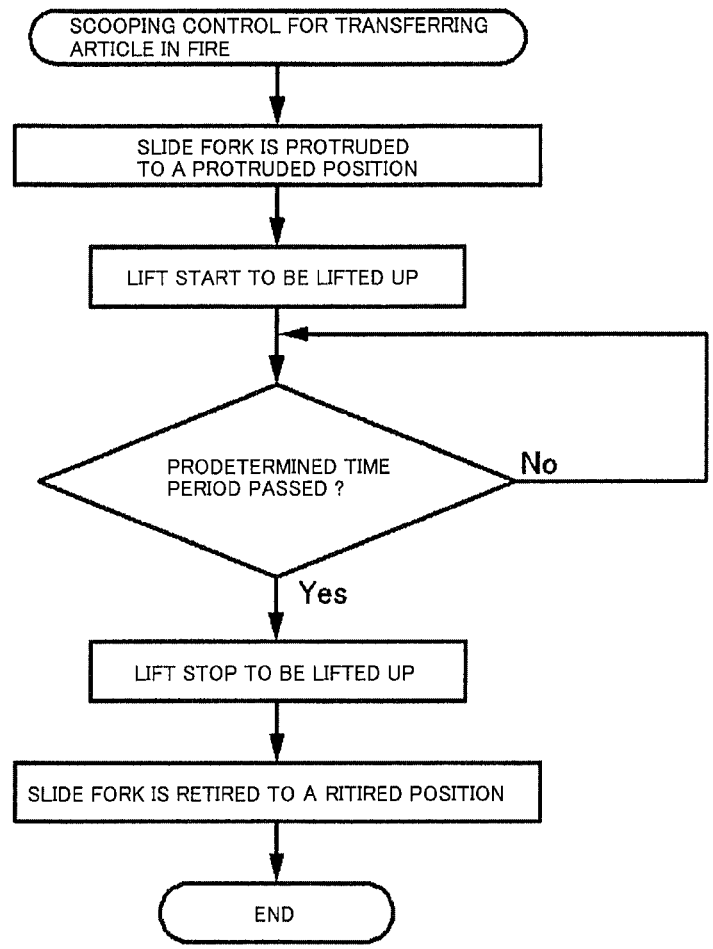
FIG. 18 is a flow chart for scooping control for transferring an article subject to fire.

As shown in the flow chart of FIG. 18, once the scooping control for transferring an article in fire starts, the transferring apparatus 19 is protruded and the amount of protrusion is controlled in accordance with the feedback signal from the electric servo motor M3 used for the slide fork 20 in order to position the slide fork 20 at a protruded position beneath the fired article Wf. Under the situation, the lifting up operation of the lift 18 starts at a predetermined lifting speed, and the lifting operation is continued until the predetermined time period is over, and then the lifting operation is stopped. Subsequently, the transferring apparatus 19 is retired back so as to position the slide fork 20 at the retired position by controlling the retiring amount in accordance with the feedback signal from the electric servo motor M3 used for the slide fork 20.

The conveying control section H1 of the crane controller 27 is constituted such that when the article in fire Wf from the stacker crane to the submerged article loading section 6b in cases when performing the fired article conveying control under the second control state, after the slide fork 20 has been positioned in a protruding position above the submerged article loading section 6b by activating the transferring apparatus 19 to protrude, the lift 18 is lifted down for a predetermined time period at a predetermined filing speed. After this, the control section H1 is constitutes to execute a scooping control for the transferring of the article in a fire by activating the transferring apparatus 19 to return so as to the slide fork 20 in a retired position.

Figure 19:
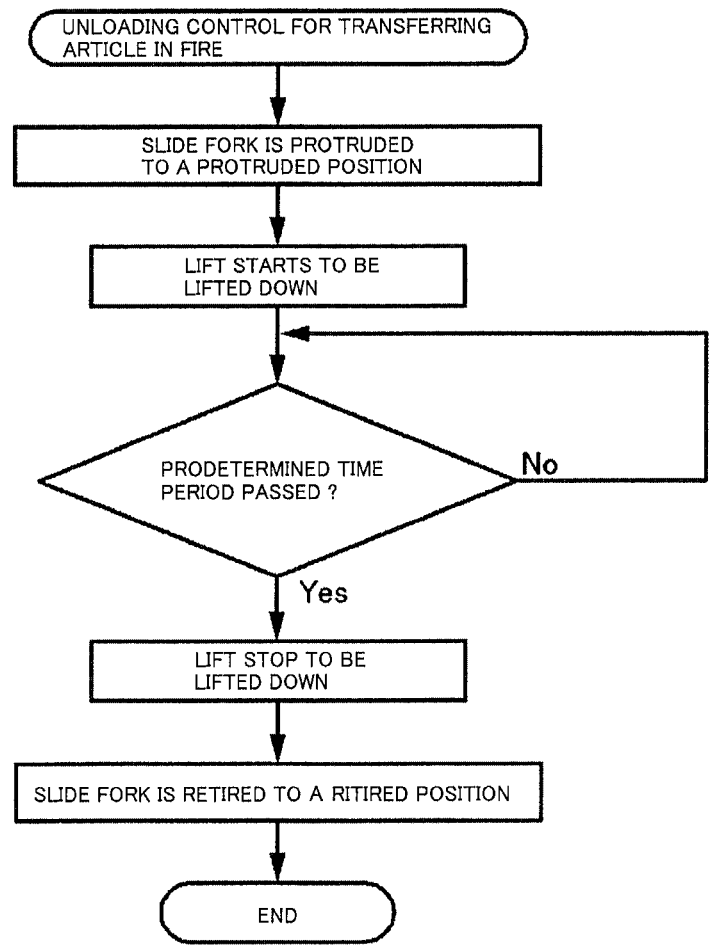
FIG. 19 is a flow chart for carrying down control for transferring an article on fire.

As shown in the flow chart of FIG. 19, once the loading control for transferring fired article starts, the transferring apparatus 19 is protruded and the amount to be protruded is controlled in accordance with the feedback signal from the electric servo motor M3 used for the slide fork 20, in order to position the slide fork 20 at the protruded position above the submerged article loading section 6b. Maintaining this state, the lifting down operation of the lift 18 starts at a predetermined lifting speed and the lifting down operation is continued until the predetermined time period is over, and then the lifting down operation is stopped. Subsequently, the transferring apparatus 19 is retired back to as position the slide fork 20 at the retired position by controlling the amount to be retired in accordance with the feedback signal from the electric servo motor M3 for slide fork.

Figure 14:
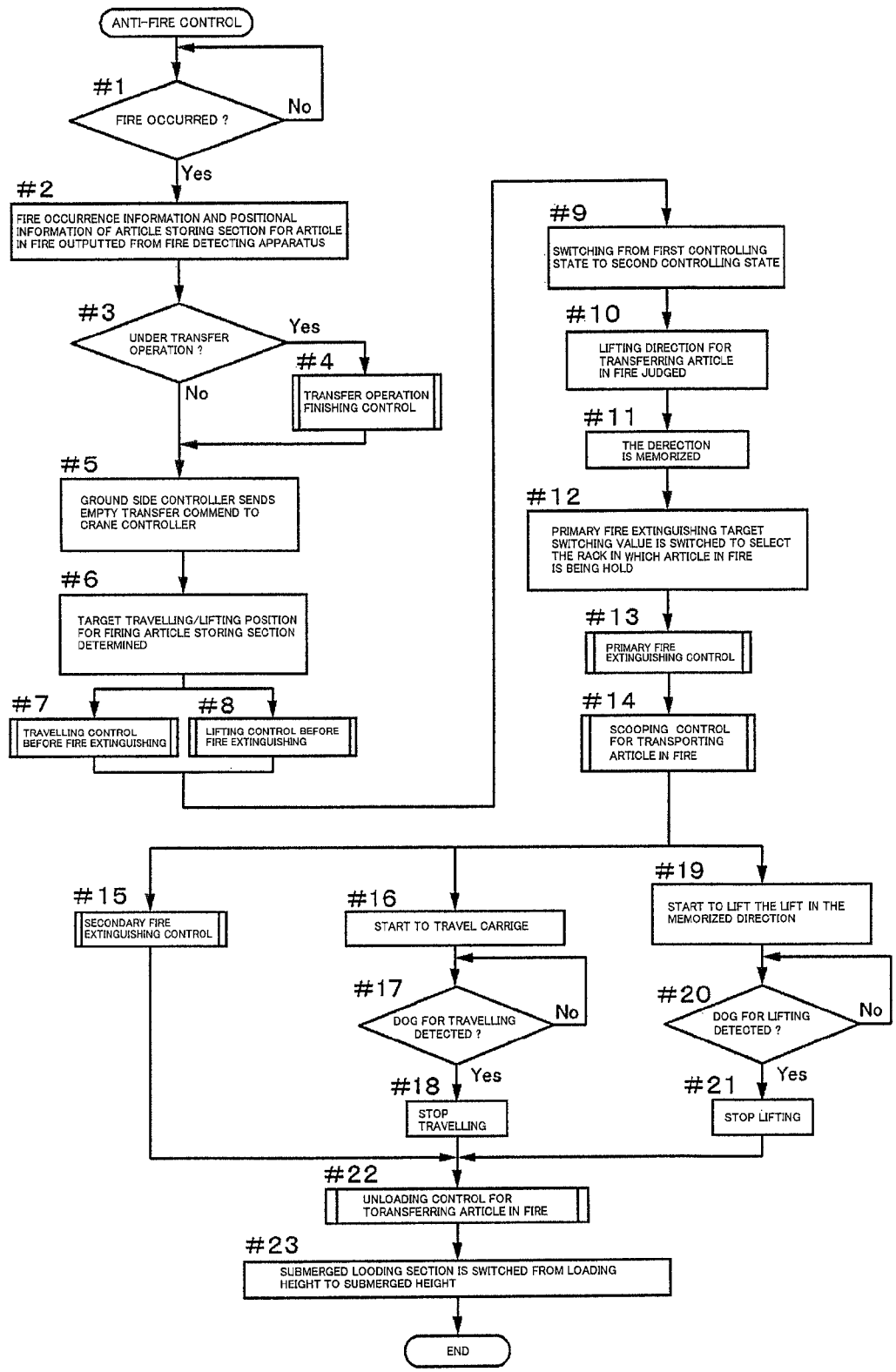
FIG. 14 is a flow chart for fire control.

Next, the control of an anti-fire system when a fire occurs in the normal article Wn stored in the article storing section 5 will be explained in accordance with the flow chart in FIG. 14. When a fire occurs in a normal article Wn, the fire sensor 10a detects the fire, the fire detecting apparatus 10b outputs fire occurrence information identifying the positional information of the article storing section 5 where the fired article Wf being held (#1 to #2). In response to the output of this information, the ground side controller 15 confirms whether the stacker crane 1 is in a stand-by mode or is operating to transfer an article. This can be confirmed by checking for the existence of information concerning whether a transferring command has been completed (#3). If the stacker crane 1 is in a stand-by mode, the ground side controller 15 sends a command to the crane controller 27 to perform a transfer operation of the fired article (#5). Whereas, if the stacker crane 1 is in a working operation performing a transfer command, the ground side controller executes a control to finish the transferring operation (#4).

Figure 15:
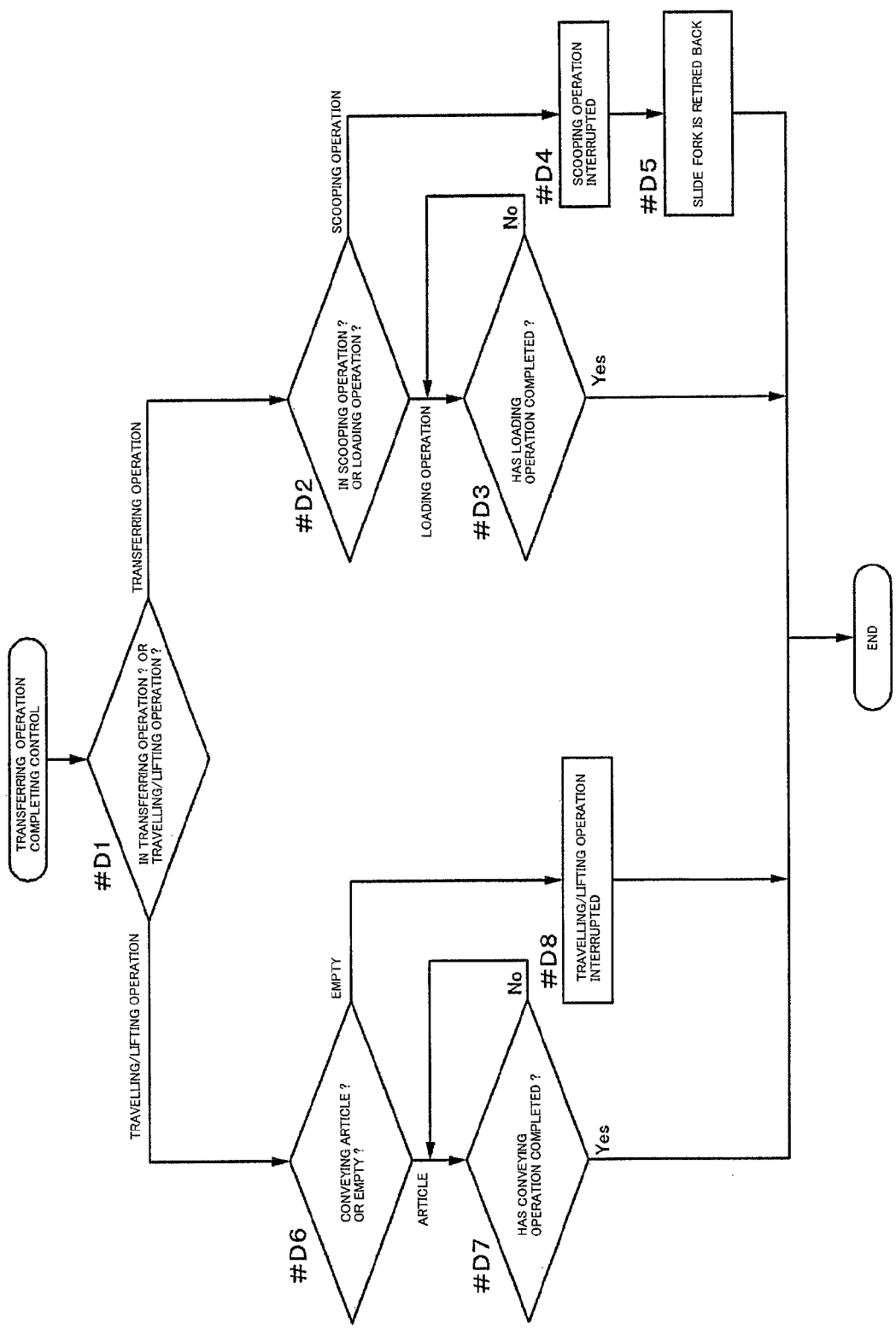
FIG. 15 is a flow chart for controlling of completing the transferring operation.

The control for finishing the transferring operation is carried out as shown in the flow chart of FIG. 15. By this control, it is confirmed whether the stacker crane 1 is operating to transfer an article or travelling/lifting up/down. This is determined by verifying the type of command for which completion information is being waited for. That is to say, in a condition of waiting for the command completion information of either the article empty transferring command or article transferring command, it is judged that the stacker crane 1 is travelling or being lifted up/down; or in a condition of waiting the scooping transferring command or the article loading command completed, it is judged as the stacker crane 1 is transferring an article (#D1). If the crane is transferring an article, the sort of transferring operation is determined by the step #D2. This is also able to be confirmed by checking the sort of transferring command for which completion information is being waited for (#D2). If the stacker crane is loading an article, it waits until this operation is completed. As soon as receiving information of completion, the stacker crane 1 will be in a stand-by condition and therefore the control for closing the transferring operation will be finished (#D3). If the crane is scooping an article, it is controlled to interrupt the scooping operation (#D4), then the slide fork 20 is retired back to the retired position by performing a revised motion of the scooping operation from the interrupted condition (#D5). Once the revised motion has been completed, the stacker crane 1 becomes into a stand-by mode and the control for finishing the transferring operation is completed. If the stacker crane 1 is travelling/lifting up/down, it is judged whether an article Wn is being transported or the stacker crane 1 is travelling/lifting up/down without transferring a normal article Wn. This can be also done by confirming the kind of conveying command. This is determined by verifying the type of command for which completion information is being waited for. (#D6). If the stacker crane is performing the article conveying command, it should wait for the completion information of this command (#D7). While, if the stacker crane is performing the article empty conveying command, the travelling operation/lifting operation is stopped to put the stacker crane 1 immediately into a stand-by mode (#D8).

Referring to FIG. 14 again, the ground side controller 15 sends an empty transferring command targeting the storing section 5, where an article in fire Wf is stored, as a conveying command to the stacker crane 1 in a stand-by mode (#5). Then, the conveying control section of the crane controller 27 functions to set a target travelling position and a target lifting position for the storing section 5 (#6). Then, the travelling control before fire extinguishing using the optical ranging meter 21 for travelling (#7) and the lifting control before fire extinguishing using the optical ranging meter 22 for lifting (#8) are conducted under the first control condition. Naturally, the traveling control and the lifting control before fire extinguishing are the same controls as those which are conducted when an empty conveying command is sent when unloading the normal article Wn.

In this manner, the ground side controller 15 and the crane controller 27 are constituted such that if an occurrence of fire is detected by the fire detecting means 10 during when the travelling control or transferring control is conducted to transport a normal article Wn between the article holding sections 4 under the first control condition, the transportation of the normal article Wn is interrupted or completed to render the stacker crane 1 into a condition in which no normal article Wn is being held thereon with the travelling control or the lifting control before fire extinguishing being is conducted thereafter.

Once the travelling and lifting controls are finished, completion information is sent from the crane controller 27 to the ground side controller 15; thereby the ground side controller 15 is switched from the first control condition to the second control condition outputs a control condition switched information to the crane controller 27. And in this way, the crane controller 27 is also switched from the first control condition of to the second control condition (#9). It should be noted that the control condition information can also be managed with the aid of condition flags in the ground side controller 15 and the crane controller 27.

In such a manner, when an occurrence of fire is detected by the fire detecting means 10 under the first control condition, the ground side controller 15 and the crane controller 27 execute the travelling control before fire extinguishing by which the stacker crane 1 is traveled to the article storing section 5 functioning as the fired article holding section for containing an article on fire Wf, while maintaining the first control state, and the lifting control before the fire extinguishing which controls the lifting operation of the lift 18 on the basis of the distance detected by the optical ranging meter 22 for lifting so that the position of the lift 18 is coincident to the target lifting position for scooping set to correspond to the storing section 5. Once the travelling and lifting controls before the fire extinguishing are completed, the first control condition is switched to the second control condition.

When the condition is switched to the second control condition, the crane controller 27 obtains the position (height) of the lift 18 on the lifting path from the distance detected by the optical ranging meter 22 for lifting without receiving any command from the ground side controller 15, and compares it to the height information of the submerged loading section 6b, which has been previously memorized, to judge in which direction the lift 18 is to be moved (up or down) during the article in fire transferring process (#10). This thus judged direction is then recorded in a memory (#11). Once the direction to be directed has been memorized, the transferring control section H1 sends an allowance for fire extinguishing to the fire extinguishing controlling section H2; thereby the fire extinguishing controlling section H2 switches the primary fire extinguishing target switching valve 39c so as to select the appropriate nozzle on the side corresponding to the article storing ruck 3 in which the article in fire Wf is being held (#12) and then to perform the primary fire extinguishing control (#13).

When the primary fire extinguishing control has been completed, the fire extinguishing control section H2 sends completion information to the conveying control section H1; thereby the conveying control section H1 performs the article scooping control for the conveying of the article in fire (#14). Since this has been done just after the spraying of carbon dioxide for 10 seconds by the primary fire extinguishing control, smoke propagated into the environment. However, as mentioned above, during the scooping controls for article in fire article transferring, the optical ranging meter 22 for lifting is not used, with the lift up stroke when scooping being done using a timer control. Therefore, even just after the primary fire extinguishing control has been completed, it is possible to transfer the fired article Wf from the storing section 5 to the stacker crane 1.

After completion of the scooping control for fired article conveying, the conveying controlling section H1 sends transfer operation completion information to the fire extinguishing control section H2, and starts to operate the carriage 16 to travel in a direction towards the home position HP (#16), and at the same time, to lift up/down the lift 18 in a memorized lifting direction (#19).

The carriage 16 continues to travel at a travelling speed for loading off the fired article. When the first proximity sensor SH1 is used for the travel stopping control detects the opposite side end of the dog DH used for travel stopping, deceleration of the carriage is initiated; then when the second proximity sensor SH2 detects the opposite side end of the dog DH used for travel stopping, the travel operation of the carriage is stopped (#17 to #18).

The lift 18 continues to be lifted up/down at a lifting speed for loading off the fired article. When the first proximity sensor SH2 used for the lift stopping control detects the opposite side end of the dog DH used for lift stop, deceleration of the carriage 16 is initiated; then when the second proximity sensor SH2 for the lift stopping control detects the opposite side end of the dog DH used for lift stopping, the travel operation of the lift is stopped (#20 to #21).

During the secondary fire extinguishing control, carbon dioxide gas is sprayed from the nozzle 31C directed to the inside of the hood for 10 seconds. In case the transferring apparatus 19 of the stacker crane 1 has arrived at the submerged article loading section 6b before the secondary fire extinguishing control has been completed, the crane 1 would waits the secondary fire extinguishing control has been completed. Then, when this has been completed, the fire extinguishing control section H2 outputs a signal that the secondary fire extinguishment has been completed to the article conveying control section H1. Thereby, the article conveying control section H1 performs the unloading control for transferring the fired article after the transferring apparatus 19 of the stacker crane 1 has arrived at the submerged article loading section 6b (#22). Since this is done just after spraying carbon dioxide gas for 10 seconds by the secondary fire extinguishing control, and this also after spraying carbon dioxide gas for 10 seconds by the primary fire extinguishing control, smoke is propagated into the environment. However, as mentioned above, during the loading off control for transferring an article on fire, the optical ranging meter 22 for lifting is not used, with the lifting down stroke for an unloading operation being done using a timer control. Therefore, even just after the primary fire extinguishment control has been completed, it is possible to transfer the fired article Wf from the storing section 5 to the stacker crane 1.

When the loading off control for an article on fire is completed, a signal showing the fact that the transferring operation has been completed signal is sent to the lifting control section of the submerged loading section 6b with the aid of a sensor for interlocking (not shown) provided on the stacker crane 1. Thereby, the lifting control section activates a cylinder 44 to extend by which the loading frame 43, onto which the article in fire Wf is loaded, is switched to a submerged height within the water bath 42 and is thus submerged so. The fire occurring on the article in fire Wf is thus extinguished. (#23)

[Other embodiments]

The embodiment of the present invention has been explained in detail above, however, the invention is not limited to the above mentioned embodiment but can be altered in many ways in a range within the scope thereof. These other embodiments of the present invention are explained below.

(1) In the above embodiment, a stacker crane is exemplified as the movable body for conveying an article. However, such a movable body for conveying an article could be, for instance, an automatic article conveying carriage, which can freely travel along the travelling path and freely transfer an article between stations functioning as article holding sections, or a ceiling transferring carriage which can freely travel along a suspended rail provided on a ceiling.

(2) In the above-mentioned embodiment, the ground side controlling apparatus and the movable body side transferring apparatus are connected in a wireless communicable manner. Alternatively, they can be connected with the aid of feeder lines along the travelling path or a general close range wireless communication apparatus.

(3) In the above-mentioned embodiment, the optical ranging means is provided on the movable body, but it can also be arranged at the ground side. In this case, it is preferred that the ground side controlling apparatus successively sends travelling speed commands to the movable body side article transferring apparatus.

(4) In the above-mentioned embodiment, the fire extinguishing means is provided on the movable body, alternatively or additionally, the means can be arranged on the ground side, for instance, on the article storing rack 3 or on the floor.

(5) In the above-mentioned embodiment, the fire extinguishing means is provided with the movable body controlling apparatus in an integrated manner, however, the concrete construction of the fire extinguishing means can be altered in different ways, such being provided as another control apparatus on the ground side.

(6) In the above-mentioned embodiment, a carbon dioxide gas is used as a fire extinguishing agent. Alternatively, a powder type fire extinguishing agent or a foam type fire extinguishing agent can be used.

(7) In the above-mentioned embodiment, the detecting apparatus for detecting the object to be detected or the detecting apparatus for detecting the elevating object to be detected are constituted by proximity sensors. However, it is possible as appropriately required to use limited switches or photo-micro switches therefor. Further, the site for attaching the detecting apparatus for detecting the object to be detected or the detecting apparatus for detecting the elevating object to be detected can also be altered in accordance with the construction thereof.

(8) In the above-mentioned embodiment, a pair of proximity sensors arranged in a movable direction is exemplified as the detecting apparatus for detecting the object to be detected. However, one or three or more proximity sensors can be used as the detecting apparatus for detecting the object to be detected. The same can be applied to the detecting apparatus for detecting the elevating object to be detected.

(9) In the above-mentioned embodiment, the object to be detected is arranged in relation to the article in fire article extinguishment section only. However, it is also possible to provide it at the position corresponding to all or part of the article holding section which includes the fired article extinguishing section.

(10) In the above-mentioned embodiment, the fire extinguishing controlling means performs both the primary and secondary fire extinguishing controls. However, it is possible to arrange the means such that it performs one of these controls or performs both of them as well as further fire extinguishing controls.

(11) In the above-mentioned embodiment, the transferring apparatus comprises the article mount body which is freely protruded/retired back. However, the apparatus can comprise a pair of grips which are freely protruded/retired back from the apparatus. The transferring aspects of the article holding section and the movable body can be altered in different ways.

(12) In the above-mentioned embodiment, the fire extinguishing means comprises a water bath. However, many varieties of fire extinguishing means can be considered instead. For example, a fire extinguishing gate, where the article travels at a low speed whilst taking fire extinguishing agent formed in sand or gravel.

LIST OF NUMERICAL REFERENCES

Wn Article
Wf Fired article
E Fire Extinguishing Control means
SH1, SH2 Proximity Sensors (Detecting means for the object to be detected)
SV1, SV2 Proximity Sensors (Detecting means for the object to be detected for lifting)
DH Object to be detected
DV Object to be detected for lifting
H2 Fire Extinguishing Control Section (Fire Extinguishing means)
H3 Emergency Stop Section (Emergency Stop Means)
1 Stacker Crane (movable body)
3 Storing rack
4 Article holding section
5 Storing Section
6 Loading section
6b Fired Article Extinguishing Section
10 Fire Detecting Means
15 Ground side controller (ground side controlling apparatus)
16 Carriage
17 Lifting mast
18 Lift
19 Transferring apparatus
20 Article mount body
21 Optical Ranging Means
22 Optical Ranging Means for lifting
27 Movable Body Controller (Movable Body side controlling apparatus)
28 Optical Communicating Apparatus
42 Fire Extinguishing Means

What is claimed is:

1. An article transporting facility comprising:
a movable body for conveying articles, the movable body can freely travel along a traveling path and can freely transfer articles among a plurality of article holding sections provided along the traveling path;
an optical range sensor for detecting a distance between a reference position and the movable body on the traveling path by projecting a measurement light along the traveling path;
a movable body controller for controlling the travel of the movable body whereby the position of the movable body, by setting a target travel position corresponding to an article holding section on the traveling path in accordance with a distance measured by the optical range sensor and for controlling the transfer of articles between article holding sections while keeping the movable body stopped at the target travel position of an article holding section, in order to transport articles between a plurality of article holding sections;

a fire detector for detecting fire in the article holding sections;

a fire extinguisher for freely spraying a fire extinguishing agent;

a fire extinguisher controller to activate the fire extinguisher when an article fire is detected by the fire detector; and an object detector provided at a side of the movable body for detecting the presence of an object associated within an article holding section;

wherein the movable body controller can be freely switched between a first control state, under which the travelling of the movable body is controlled in accordance with the distance measured by the optical range sensor, and a second control state, under which the travelling of the movable body is controlled such that the movable body travels to a target travel position set to correspond to an article holding section where the object detector detects the object to be detected pertaining to the article holding section which holds the article to be transferred;

wherein the first control state is maintained during a time when no fire is detected by the fire detector, wherein the first control state is switched to the second control state after a fire is detected;

wherein at least one of the plurality of article holding sections is designated as a burning article extinguishing section that is provided with a fire extinguishing device;

wherein the fire detector detects both the occurrence of fire and identifies the holding section where the burning article is located;

wherein a travelling speed of the movable body under the second control state is set to be slower than the travelling speed of the movable body under the first control state;

wherein the movable body controller is constructed such that when an occurrence of fire is detected by the fire detector under the first control state, it controls the movable body to travel to the burning article holding section under the first control state then the first control state is switched to the second control state, and under the second control state it performs the travelling and transferring operation of the movable body to convey the burning article from the burning article holding section to the burning article extinguishing section; and wherein when the travel of movable body to the burning article holding section under the first control state has been completed the fire extinguisher controller operates the fire extinguisher to perform the fire extinguishing.

2. The article transporting facility according to claim 1, wherein the object detector comprises a proximity sensor which can function in the presents of smoke or a fire extinguishing agent.

3. The article transporting facility according to claim 1, wherein the movable body controller is constructed such that when an occurrence of fire is detected by the fire detector, during a period when the movable body is conveying an article under the first control state, once the transfer of the article has been interrupted or completed to render the movable body in a condition in which it holds no article, the moveable body controller controls the now empty movable body to travel to the burning article holding section.

4. The article transporting facility according to claim 1, wherein:
the fire extinguisher is provided on the movable body and is constructed to be capable of freely spraying an extinguishing agent against the burning articles held in the burning article holding section and against the burning article held on the movable body;

the fire extinguisher controller is constituted such that once the travel of movable body to the burning article holding section under the first control state has been completed a primary fire extinguishing control for controlling the operation of the fire extinguisher to spray the fire extinguishing agent against the burning articles held in the burning article holding section is performed for a first predetermined period of time, and once the transfer of the burning article from the burning article holding section to the movable body has been completed, a secondary fire extinguishing control for controlling the operation of the fire extinguisher to spray the fire extinguishing agent against the burning articles held on the movable body is performed for a second predetermined period of time; and when the primary fire extinguishing control by the fire extinguisher controller has been completed, the movable body controller initiates the performing of the travelling and transferring operation of the movable body.

5. The article transporting facility according to claim 1, further comprising;
an article storing rack having a plurality of article storage sections arranged vertically and horizontally in an extensive manner, and article loading portions being provided at a lateral side and in a width direction of the article storing rack, wherein at least one of the article loading portions are provided on the burning article extinguishing section.

6. The article transporting facility according to claim 5, wherein the movable body comprises a stacker crane, which freely travels along a travelling path provided at a front surface side of the article storing rack and freely transfers articles between the article storage sections and the article loading portions functioning as the article holding sections.

7. The article transporting facility according to claim 6, wherein the stacker crane comprises:
a carriage being able to freely travel along the travelling path;
a lift being freely liftable up and down along a lifting path provided along a mast spaced from the carriage;
a transferring apparatus being freely liftable up and down integrally with the lift and having an article mount for mounting and supporting articles, which is arranged to be movable back and forth between a retired position back from a travelling path side and a protruded position protruding to the article storing rack side;
an optical range sensor used for a lifting operation for detecting a distance between a reference position and the lift on the lifting path by projecting a measurement light along the mast;
an object to be detected used for controlling the stopping of the lift, the object to be detected is provided on the mast in correspondence to a height of the lift when transferring an article to the burning article extinguishing section; and
an object detector provided on the lift for detecting the presence of the object to be detected.

8. An article transporting facility comprising:
a movable body for conveying articles, the movable body can freely travel along a traveling path and can freely transfer articles among a plurality of article holding sections provided along the traveling path;
an optical range sensor for detecting a distance between a reference position and the movable body on the traveling path by projecting a measurement light along the traveling path;
a movable body controller for controlling the travel of the movable body whereby the position of the movable body, by setting a target travel position corresponding to an article holding section on the traveling path in accordance with a distance measured by the optical range sensor and for controlling the transfer of articles between article holding sections while keeping the movable body stopped at the target travel position of an article holding section, in order to transport articles between a plurality of article holding sections;
a fire detector for detecting fire in the article holding sections;
a fire extinguisher for freely spraying a fire extinguishing agent;
a fire extinguisher controller to activate the fire extinguisher when an article fire is detected by the fire detector; and
an object detector provided at a side of the movable body for detecting the presence of an object associated within an article holding section;
wherein the movable body controller can be freely switched between a first control state, under which the travelling of the movable body is controlled in accordance with the distance measured by the optical range sensor, and a second control state, under which the travelling of the movable body is controlled such that the movable body travels to a target travel position set to correspond to an article holding section where the object detector detects the object to be detected pertaining to the article holding section which holds the article to be transferred;
wherein the first control state is maintained during a time when no fire is detected by the fire detector, wherein the first control state is switched to the second control state after a fire is detected;
wherein the movable body controller comprises a ground side controlling apparatus being provided at the end portion of the travelling path at the ground side and a movable body side controlling apparatus being provided at the movable body side that is capable of freely communicating wirelessly with the ground side controlling apparatus with the aid of an optical communication device for transmitting and receiving a communicating light along the travelling path;
wherein an emergency stop is provided, by which the travelling of the movable body is made to stop in case that the communicating light is blocked when the movable body controller is in the first control state; and
wherein the emergency stop is constructed such that when the movable body controller is in the second control state, it does not make the movable body stop even if the communicating light is blocked.

9. The article transporting facility according to claim 8, wherein the object detector comprises a proximity sensor which can function in the presents of smoke or a fire extinguishing agent.

10. A method for operating the movable body controller of the article transporting facility according to claim 7: when an article is transferred from the article holding section to the stacker crane under the first control condition, the method comprising the step of:
controlling the travelling operation of the carriage so that the carriage is positions at a target travelling position corresponding to the article holding section;
controlling the lifting operation of the lift so that the lift is positioned at a target lifting position corresponding to the article holding section for scooping an article, in accordance with the distance detected by the optical range sensor for lifting operation;
protruding the article transferring apparatus so that the article mount body is positioned under the article to be transferred at the protruded position while keeping the carriage stopped at the target travelling position corresponding to the article holding section;
lifting up the lift is so that the distance detected by the optical range sensor changes by a predetermined amount; and
retiring back the article transferring apparatus so that the article mount body is positioned at the retired position to perform the scooping operation.

11. The method according to claim 10, when an article is transferred from the stacker crane to the article holding section under the first control condition, the method further comprising the step of:
controlling the travelling operation of the carriage so that the carriage is positioned at a target travelling position corresponding to the article holding section;
controlling the lifting operation of the lift so that the lift is positioned at a target lifting position for unloading, in accordance with the distance detected by the optical range sensor for lifting operation;
protruding the article transferring apparatus so that the article mount body is positioned above the article holding section at a protruded position whilst the carriage is kept stopped at the target travelling position corresponding to the article holding section;
lifting down the lift so that the distance detected by the optical range sensor changes by a predetermined amount; and
retiring back the article transferring apparatus so that the article mount body is positioned at the retired position to perform the unloading operation.

12. The method according to claim 11, when an occurrence of fire is detected by the fire detector under the first control condition, the method further comprising the step of:
controlling the stacker crane so as to move to a target travelling position corresponding to the article storing section of the burning article holding section;
controlling the lifting operation of the lift so that the lift is positioned at the target lifting position corresponding to the article storing position for the scooping operation, in accordance with the distance detected by the optical range sensor for lifting operation; and
switching the condition from the first control condition to the second control condition, once the controlling steps for moving the stacker crane and the lifting operation of the lift has been completed.

13. The method according to claim 12, when the burning article is transferred from the article storing section to the stacker crane while the travelling and transferring operation of the movable body is performed under the second control condition, the method further comprising the step of:
protruding the article transferring apparatus so that the article mount body is positioned under the burning article at the protruded position;

lifting up the lift at a predetermined lifting speed for a predetermined period of time; and retiring back the article transferring apparatus so that the article mount body is positioned at the retired position to perform the scooping operation for the burning article.

14. The method according to claim 13, when the burning article is transferred from the stacker crane to the burning article extinguishing section while the travelling and transferring operation of the movable body is performed under the second control condition, the method further comprising the step of:

protruding the article transferring apparatus so that the article mount body is positioned above the burning article extinguishing section at the protruded position;

lifting down the lift at a predetermined lifting speed for a predetermined period of time; and retiring back the article transferring apparatus so that the article mount body is positioned at the retired position to perform the unloading operation for the burning article.

* * * * *

UNITED STATES PATENT AND TRADEMARK OFFICE
CERTIFICATE OF CORRECTION

PATENT NO. : 9,221,606 B2
APPLICATION NO. : 13/811458
DATED : December 29, 2015
INVENTOR(S) : Kazuharu Yoshinaga et al.

It is certified that error appears in the above-identified patent and that said Letters Patent is hereby corrected as shown below:

IN THE CLAIMS

Column 27, Line 53, Claim 1:

After "wherein when the travel"
Insert -- of --.

Column 27, Line 59, Claim 2:

After "which can function in the"
Delete "presents" and
Insert -- presence --.

Column 28, Line 11, Claim 4:

After "wherein when the travel"
Insert -- of --.

Column 29, Line 64, Claim 9:

After "which can function in the"
Delete "presents" and
Insert -- presence --.

Column 30, Line 5, Claim 10:

After "the carriage is"
Delete "positions" and
Insert -- positioned --.

Signed and Sealed this
Twelfth Day of April, 2016

Michelle K. Lee
*Director of the United States Patent and Trademark Office*

CERTIFICATE OF CORRECTION (continued)
U.S. Pat. No. 9,221,606 B2

Column 30, Line 17, Claim 10:

After "lifting up the lift"
Delete "is".